(12) United States Patent
Frank et al.

(10) Patent No.: US 9,538,478 B2
(45) Date of Patent: Jan. 3, 2017

(54) METHOD AND SYSTEM FOR MANAGING TRANSMIT POWER ON A WIRELESS COMMUNICATION NETWORK

(71) Applicant: GOOGLE TECHNOLOGY HOLDINGS LLC, Mountain View, CA (US)

(72) Inventors: Colin D. Frank, Park Ridge, IL (US); Tyler A. Brown, Mundelein, IL (US); Sandeep H. Krishnamurthy, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/962,036

(22) Filed: Dec. 8, 2015

(65) Prior Publication Data

US 2016/0088569 A1 Mar. 24, 2016

Related U.S. Application Data

(62) Division of application No. 13/669,429, filed on Nov. 5, 2012, now Pat. No. 9,220,070.

(51) Int. Cl.
  *H04W 52/14* (2009.01)
  *H04W 52/06* (2009.01)
  *H04W 52/36* (2009.01)

(52) U.S. Cl.
  CPC ........... *H04W 52/146* (2013.01); *H04W 52/06* (2013.01); *H04W 52/367* (2013.01); *Y02B 60/50* (2013.01)

(58) Field of Classification Search
  CPC .. H04W 52/06; H04W 52/146; H04W 52/367; Y02B 60/50
  See application file for complete search history.

(56) References Cited

U.S. PATENT DOCUMENTS

| 6,310,634 B1 | 10/2001 | Bodnar et al. |
| 7,336,263 B2 | 2/2008 | Valikangas |
| 7,706,332 B2 | 4/2010 | Ozluturk et al. |

(Continued)

FOREIGN PATENT DOCUMENTS

| WO | 2011098275 A1 | 8/2011 |
| WO | 2011139201 A1 | 11/2011 |

OTHER PUBLICATIONS

United States Patent and Trademark Office; Non Final Rejection for U.S. Appl. No. 14/068,011 (related to above-captioned patent application); dated Oct. 23, 2015.

(Continued)

*Primary Examiner* — Siming Liu
(74) *Attorney, Agent, or Firm* — Faegre Baker Daniels LLP

(57) ABSTRACT

The present disclosure sets forth multiple embodiments of the invention. Among those embodiments is a method for determining a maximum power reduction of an uplink signal. The uplink signal is transmitted on a carrier that has a range of frequencies. Frequencies outside of the carrier frequency range include adjacent channel regions. Resource blocks of the carrier that have been allocated for use by to transmit the uplink signal are identified. A power spectral density is determined based on the identified resource blocks. A metric that is based on a third order convolution of the power spectral density function is determined. A maximum power reduction for the adjacent channel regions is also determined based on the metric.

8 Claims, 11 Drawing Sheets

(56) References Cited

U.S. PATENT DOCUMENTS

| | | |
|---|---|---|
| 7,711,385 B2 | 5/2010 | Ostman et al. |
| 7,760,187 B2 | 7/2010 | Kennedy |
| 2002/0057659 A1 | 5/2002 | Ozluturk et al. |
| 2006/0166691 A1 | 7/2006 | Medrano |
| 2007/0262956 A1 | 11/2007 | Chen |
| 2009/0181687 A1 | 7/2009 | Tiirola et al. |
| 2010/0029289 A1 | 2/2010 | Love et al. |
| 2010/0049522 A1 | 2/2010 | Tamura et al. |
| 2010/0066764 A1 | 3/2010 | Refai |
| 2010/0197339 A1 | 8/2010 | Pedersen et al. |
| 2011/0081936 A1 | 4/2011 | Haim et al. |
| 2011/0110257 A1 | 5/2011 | Kim et al. |
| 2011/0170435 A1 | 7/2011 | Kim et al. |
| 2011/0170496 A1 | 7/2011 | Fong et al. |
| 2011/0199986 A1 | 8/2011 | Fong et al. |
| 2011/0246943 A1 | 10/2011 | Fujibayashi |
| 2011/0319119 A1 | 12/2011 | Ishii |
| 2011/0319120 A1 | 12/2011 | Chen et al. |
| 2011/0320978 A1 | 12/2011 | Horodezky et al. |
| 2012/0009962 A1 | 1/2012 | Liu et al. |
| 2012/0019540 A1 | 1/2012 | Yaksick et al. |
| 2012/0044898 A1 | 2/2012 | Ishii |
| 2012/0327866 A1 | 12/2012 | Krishnamurthy et al. |
| 2014/0049477 A1 | 2/2014 | Dai et al. |
| 2014/0126440 A1 | 5/2014 | Frank et al. |

OTHER PUBLICATIONS

LG Electronics: "RF Simulation results for multi-clustered simultaneous transmission for single CC and multiple CC"; 3GPP Draft; R4-114176 MPR fo Multi Cluster Simultaneous Transmission for CA REV4, 3rd Generation Partnership Project (3GPP), Mobile Competence Centre; 650, Route Des Lucioles; F-06921 Sophia-Antipolis Cedex; Frane, vol. RAN WG4, No. Athens, Greece; 20110822, Aug. 17, 2011, all pages.

Patent Cooperation Treaty, International Search Report and Written Opinion of the International Searching Authority for International Application No. PCT/US2013/065845 (CS41003); Nov. 27, 2013; 13 pages.

Patent Cooperation Treaty, International Search Report and Written Opinion of the International Searching Authority for International Application No. PCT/US2013/046262 (CS39777), Sep. 26, 2013, 13 pages.

3GPP TR 36.807 v10.0.0 (Jul. 2012) "3rd Generation Partnership Project; Technical Specification Group Radio Access 1etwork; Evolved Universal Terrestrial Radio Access (E-UTRA); User Equipment (UE) radio transmission and reception (Release 10)", 181 pgs.

3GPP TSG-RAN Working Group 4 (Radio) 357AH, R4-110458 "MPR for non-contiguous allocation", Nokia, Renesas Electronics Europe; Austin, Texas; Jan. 17-21, 2011, 22 pgs.

3GPP TSG RAN WG4 (Radio) #58AH, R4-112089 "MPR for non-contiguous transmission" Ericsson, ST-Ericsson; Shanghai, China; Apr. 11-15, 2011, 4 pages.

3GPP TSG RAN WG4 (Radio) #58 R4-110955 "MPR for LTE multi cluster transmission" Nokia, Renesas Electronics urope; Taipei, Taiwan; Feb. 21-15, 2011, 22 pages.

3GPP TR 36.807 V0.1.0 (Aug. 2010) R4-103431, Technical Report, 3rd Generation Partnership Project; Technical Specification Group Radio Access Network; Evolved Universal Terrestrial Radio Access (E-UTRA); User Equipment (UE) radio transmission and reception; (Release 10), 94 pages.

Patent Cooperation Treaty, "PCT Search Report and Written Opinion of the International Searching Authority" or International Application No. PCT/US2012/040996 (CS38900) dated Nov. 6, 2012, 21 pages.

Draft 3GPP TS 36.213 Va2.0 (Jun. 2011) 3rd Generation Partnership Project; Technical Specification Group Radio 4ccess Newtork; Evolved Universal Terrestrial Radio Access (E-UTRA) Physical Layer Procedures (Release 10), 182 pages.

R4-113256 3GPP Tr 36.807 v1.5.0 (May 2011) Technical Report, 3rd Generation Partnership Project; Technical Specification Group Radio Access Network; Evolved Universal Terrestrial Radio Access (E-UTRA); User Equipment (UE) Radio Transmission and Reception; (Release 10), 120 pages.

3GPP TSG RAN WG4 (Radio) #58, R4-111456 "A Note on MPR for Carrier Aggregation" Ericsson, ST-Ericsson; Taipei, Taiwan; Feb. 21-25, 2011, 6 pages.

3GPP TSG RAN WG4 #51, R4-092056 "Out of Band Emission and MPR for DC-HSUPA" Ericsson; San Francisco, USA; May 4-8, 2009, 6 pages.

Krishnamurthy et al., "Multi-Cluster Uplink Transmission in Wireless Communication Network" United States Patent and Trademark Office, U.S. Appl. No. 14/068,001 (CS38900 C01) filed Oct. 31, 2013, 39 pages.

Crank et al., Method and System for Managing Transmit Power on a Wireless Communication Network: United States Patent and Trademark Office, U.S. Appl. No. 13/549,666 (CS39777) filed Jul. 16, 2012; 52 pages.

METHOD AND SYSTEM FOR MANAGING TRANSMIT POWER ON A WIRELESS COMMUNICATION NETWORK

CROSS REFERENCE TO RELATED APPLICATIONS

The present application is a division of U.S. application Ser. No. 13/669,429, filed on Nov. 5, 2012, the contents of which are incorporated herein by reference and from which benefits are claimed under 35 U.S.C. 120.

TECHNICAL FIELD

The present disclosure relates generally to wireless communications and, more particularly, to managing transmit power in a wireless communication device for multi-cluster transmissions.

BACKGROUND

Modern wireless communication networks typically allocate resources to various devices by allocating certain frequencies to the devices at various time slots. However, it is often the case that uplink transmission signals of one or more devices on the network leak into non-allocated frequencies. Such signals can interfere with communications of other devices on the network and with communications of devices on other networks.

BRIEF DESCRIPTION OF THE DRAWINGS

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
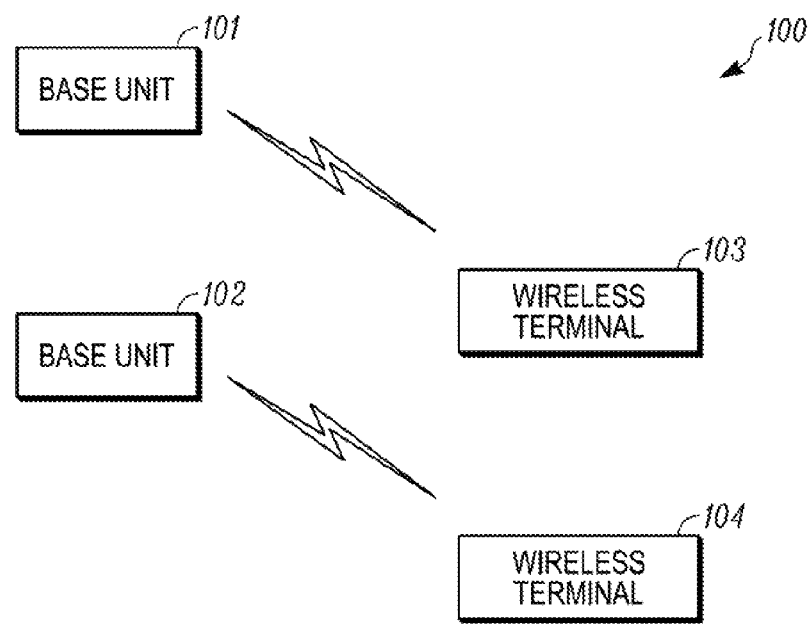
FIG. 1 is a wireless communication system in accordance with an embodiment of the invention.

The present disclosure sets forth multiple embodiments of the invention.

In an embodiment, a method for determining a maximum power reduction of an uplink signal, the uplink signal being transmitted on a carrier, the carrier having a range of frequencies, wherein frequencies outside of the carrier frequency range include adjacent channel regions, comprises identifying resource blocks of the carrier that have been allocated for use by to transmit the uplink signal; determining, based on the identified resource blocks, a power spectral density; determining a metric, the metric being based on a third order convolution of the power spectral density function; and determining a maximum power reduction for the adjacent channel regions based on the determined metric.

In another embodiment, a method for determining a maximum power reduction of an uplink signal, the uplink signal being transmitted on a carrier, the carrier having a range of frequencies, wherein frequencies outside of the carrier frequency range include spurious regions, comprises identifying resource blocks of the carrier that have been allocated to transmit the uplink signal; determining, based on the identified resource blocks, a power spectral density; determining a metric, the metric being based on a fifth order convolution of the power spectral density function; and determining a maximum power reduction for the spurious regions based on the determined metric.

In another embodiment, a method of determining a maximum power reduction of a wireless terminal comprises determining whether a frequency span of the n-th order convolution of the uplink signal overlaps with the spurious region; if it is determined that a frequency span of the n-th order convolution of the uplink signal overlaps with the spurious region, determining a maximum power reduction using a first map; and if it is determined that a frequency span of the n-th order convolution of the uplink signal does not overlap with the spurious region, determining a maximum power reduction using a second map.

What follows is a more in-depth discussion of the various embodiments.

In a recent LTE standard, 3GPP LTE Rel-10, OFDM-based multi-cluster transmission for uplink within a component carrier and with carrier aggregation (e.g., intra-band contiguous carrier aggregation of two or more carriers) has been specified. Such transmission may include first Physical Uplink Shared Channel (PUSCH) transmitted simultaneously with a second PUSCH, a PUSCH transmitted simultaneously with a Physical Uplink Control Channel (PUCCH), and a Sounding Reference Signal (SRS) transmitted simultaneously with a SRS. In some embodiments, such simultaneous transmissions are made by a single power amplifier (PA) in the wireless terminal.

Several problems have arisen with PUSCH and PUCCH transmissions. When there is a large power imbalance between any two clusters, the resource allocation can be either limited by Out-of-Band/In-Band (OOB/IB) emissions or by an error vector magnitude (EVM) on the cluster with lower transmit power. It is often the case that uplink transmissions of devices in wireless networks leak into non-allocated frequencies. To address this problem, some industry groups have designated limits on how much leakage is permissible. In order to comply with such restrictions, it is often necessary for the devices to reduce or "back off" their transmit power. Ideally, the devices will back off their transmit power just enough to meet the leakage limits. But if the devices back off more than is necessary, then their maximum transmit power will be reduced unnecessarily.

An example of a wireless communication system in which various embodiments of the invention may be implemented will now be described with reference to FIG. 1. In FIG. 1, a wireless communication system 100 comprises one or multiple base units, represented by base units 101 and 102 in FIG. 1. The base units 101 and 102 are part of an infrastructure network that is distributed over a geographical region, and which serves one or multiple wireless terminals—represented in FIG. 1 by wireless terminals 103 and 104—in the time, frequency or spatial domain or a combination thereof. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, pico-cell, network node or by other terminology used in the art. The base units 101 and 102 each comprise one or more transmitters for downlink transmissions and one or more receivers for uplink transmissions. The base units 101 and 102 are generally part of a radio access network of the system 100. The radio access network typically includes one or more controllers communicably coupled to one or more of the base units 101 and 102. The access network is generally communicably coupled to one or more core networks of the system 100, and may be coupled to other networks like the Internet and public switched telephone networks among others.

The base units of the wireless communication system 100 serve the wireless terminals 103, 104 within a corresponding serving area, for example, a cell or a cell sector, via a wireless communication link. The wireless terminals 103 and 104 may be fixed or mobile. Wireless terminals may also be referred to as subscriber units, mobiles, mobile stations, mobile units, users, terminals, subscriber stations, user equipment (UE), user terminals, wireless communication devices, relay node, or by other similar terminology. Examples of wireless terminals include cell phones, smart phones, tablet computers, and personal computers with wireless capability. The wireless terminals 103 and 104 also comprise one or more transmitters and one or more receivers. The base units 101 and 102 transmit downlink communication signals in the time, frequency and/or spatial domain to serve the wireless terminals 103 and 104. The wireless terminals 103 and 104 communicate with the base units 101 and 102 via uplink communication signals, also in the time, frequency and/or spatial domain. The wireless terminals may also communicate with the base unit via a relay node.

In one implementation, the wireless communication system 100 of FIG. 1 is compliant with the 3GPP Universal Mobile Telecommunications System (UMTS) Long-Term Evolution (LTE) protocol Release 10 (Rel-10). The LTE protocol may also be referred to as EUTRA or 3GPP LTE or some later generation thereof. In an LTE implementation, the base units 101 and 102 transmit using an orthogonal frequency division multiplexing (OFDM) modulation scheme on the downlink and the wireless terminals 103 and 104 transmit on the uplink using a single carrier—frequency division multiple access (SC-FDMA) scheme. The wireless communication system 100 may implement some other open or proprietary communication protocol, for example, IEEE 802.16(d) (WiMAX), IEEE 802.16(e) (mobile WiMAX), among other existing and future protocols. This disclosure is not intended to be implemented in any particular wireless communication system architecture or protocol.

The architecture of the communication system 100 may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system 100 may use other communication system protocols including, but not limited to, TDMA or direct sequence CDMA. The communication system 100 may be a Time Division Duplex (TDD) or Frequency Division Duplex (FDD) system.

An example of a wireless terminal configured according to an embodiment of the invention will now be described with reference to FIG. 2. The wireless terminal 200 includes a transceiver 210 communicably coupled to a controller 220. The transceiver, in conjunction with one or more antennas, transmits signals. For example, the transceiver may transmit uplink signals, and the power of the uplink signals may be configured according to the various embodiments described herein. The wireless terminal implements a wireless communication protocol, as discussed above, and may be capable of conducting circuit or packet switched communications or both. The wireless terminal may also comprise a user interface 230 for performing other functionality typically associated with wireless communication terminals, including but not limited to a keypad or other input device, a display, audio inputs and outputs among other user interface devices. In one embodiment, the controller 220 is implemented as a digital processor that executes instructions stored in one or more memory devices 240 to perform the functionality described in the present disclosure, including the various calculations described below. Alternatively, the controller 220 may be implemented as an equivalent hardware circuit or as a combination of hardware and software. In one embodiment, various aspects of which are described further below in the context of an LTE communication system, the wireless terminal is a Discrete Fourier Transform-Spread-Orthogonal Frequency Division Multiple Access (DFT-S-OFDMA) UE. In other embodiments, the wireless terminal may implement one or more other protocols.

Figure 3:
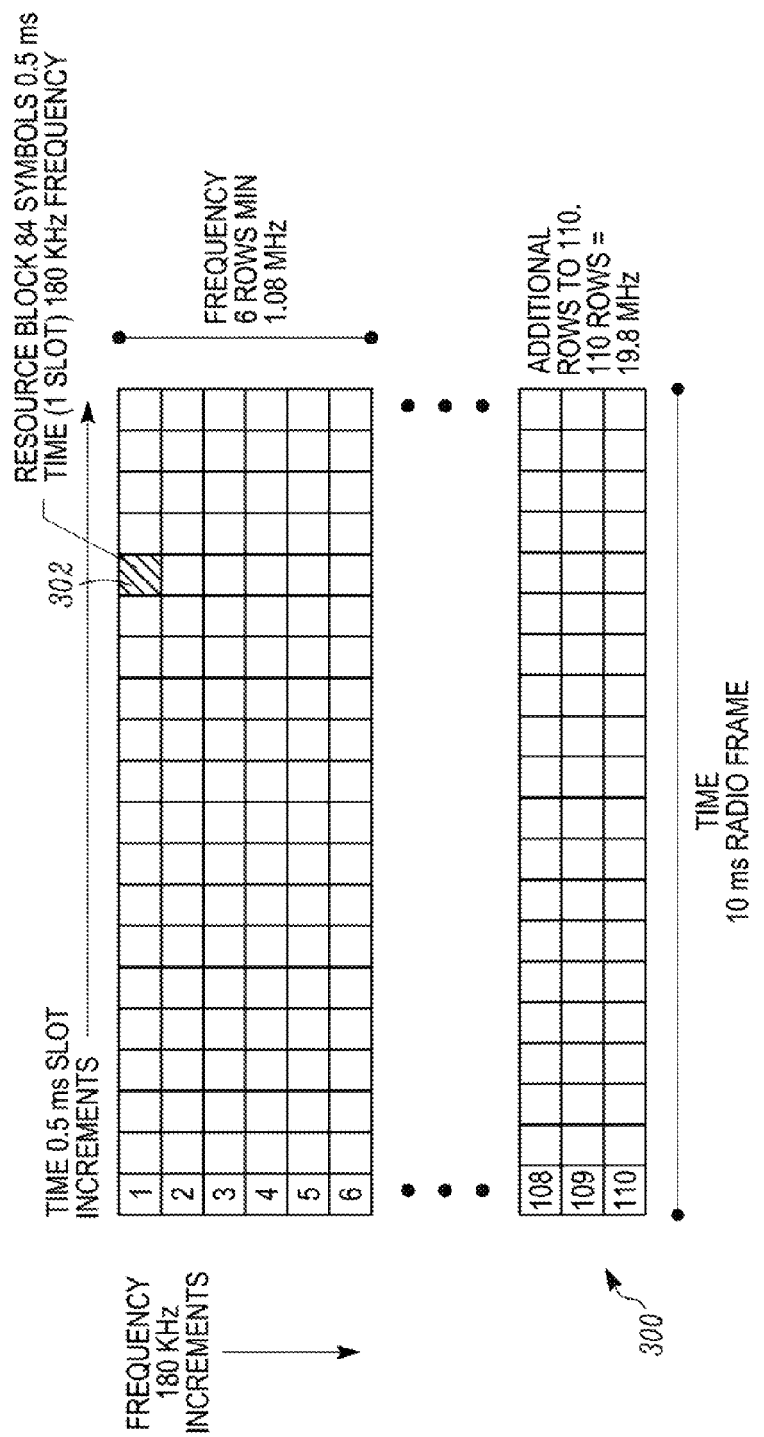
FIG. 3 depicts a communication sub-frame according to an embodiment of the invention.

Referring back to FIG. 1, the signals travelling between the wireless terminals 103 and 104 and the base units 101 and 102 in an embodiment of the invention may be carried by SC-FDMA signals organized into radio frames. Each radio frame typically includes ten sub-frames. An example of the structure of a sub-frame is shown in FIG. 3. The sub-frame 300 is depicted in the context of a time-frequency diagram. A vertical scale of the diagram depicts multiple blocks of frequency, or frequency bins (frequency subcarriers), of the sub-frame 300 that may be allocated for transmission. A horizontal scale of the diagram depicts multiple blocks of time (in units of time slots) of the sub-frame 300 that may be allocated. The sub-frame 300 comprises multiple resource blocks (RBs) such as the RB 302. Each RB comprises 12 SC-FDMA subcarriers over a time slot comprising seven (7) SC-FDMA symbols for the normal cyclic prefix (CP) case. Typically, the sub-frame duration is 1 ms and it can comprise two time slots of 0.5 ms duration each. In turn, each RB can be divided into multiple resource elements (REs). Each RE is a single SC-FDMA subcarrier, or frequency bin, on a single SC-FDMA symbol. It is to be noted that many frames and sub-frames may be transmitted from the wireless terminals to the base units and vice-versa, and that various channels may occupy slots in many sub-frames.

Referring back to FIG. 1, when the wireless terminals transmit signals to the base units 101 and 102, such as with PUSCH and PUCCH transmissions in LTE networks, it is often the case that signals leak into frequencies other than those for which they are intended. An illustration of such leakage will now be given with reference to FIG. 4, which depicts a frequency spectrum 400. The specific frequency values are for purposes of illustration only, and many other frequency values and ranges may be used. The frequencies on the spectrum 400 increase from lower frequencies on the left to higher frequencies on the right. The frequency spectrum 400 includes an in-band region 402. The bandwidth of the in-band region is $\Delta f_{in\text{-}band}$, which spans a range of 10 MHz. The signal or signals transmitted in the in-band region may be referred to as the carrier. The carrier is centered around a carrier frequency 404. The carrier frequency is generally based on the frequency of a local oscillator (LO) of the wireless terminal. The in-band region spans a range of frequencies from a first edge 402A to a second edge 402B. The in-band region 402 includes a first internal guard band region that spans from the first edge 402A of the in-band region 402 to an edge 402C. The first internal guard band region is 5% of the width of the in-band region 402, which is 0.5 MHz in this example. The edge 402C of the first internal guard band region is higher in frequency than the first edge 402A of the in-band region 402. The in-band region 402 also includes a second internal guard band region that spans from the second edge 402B of the in-band region 402 to an edge 402D. The second internal guard band region is 5% of the width of the in-band region 402, which is 0.5 MHz in this example. The edge 402D of the second internal guard band region is lower in frequency than the second edge 402B of the in-band region 402 Adjacent to the in-band region 402 is a first adjacent channel (AC) region 406 that spans from the first edge 402A of the in-band region 402 to an edge 406A that is located at a frequency lower than that of the first edge 402A of the in-band region 402. Also adjacent to the in-band region 402 is a second AC region 408 that spans from the second edge 402B of the in-band region 402 to an edge 408A located at a frequency higher than that of the second edge 402B of the in-band region 402.

In an embodiment of the invention, the adjacent channel regions may be specified by standards agreed upon by industry groups. For example, in one implementation of the LTE 3GPP standard, the adjacent channel regions above and below the in-band region can be divided into two regions: Adjacent Channel Leakage Ratio (ACLR) 1 and ACLR 2, where ACLR 1 spans 5 MHz above and below the in-band region and ACLR 2 spans 5 MHz above and below the ACLR 1 region. In another implementation, a single region above and below the in-band region, referred to as the Evolved Universal Terrestrial Radio Access (E-UTRA) ACLR, spans from the upper and lower edges of the in-band region to frequencies above and below the in-band region. The size of the E-UTRA ACLR region varies according to the size of the in-band region.

The frequency spectrum 400 also includes a first spurious region 410, which includes all frequencies below the edge 406A of the first AC region 406 and a second spurious region 412, which includes frequencies above the edge 408A of the second AC region 408.

Figure 4:
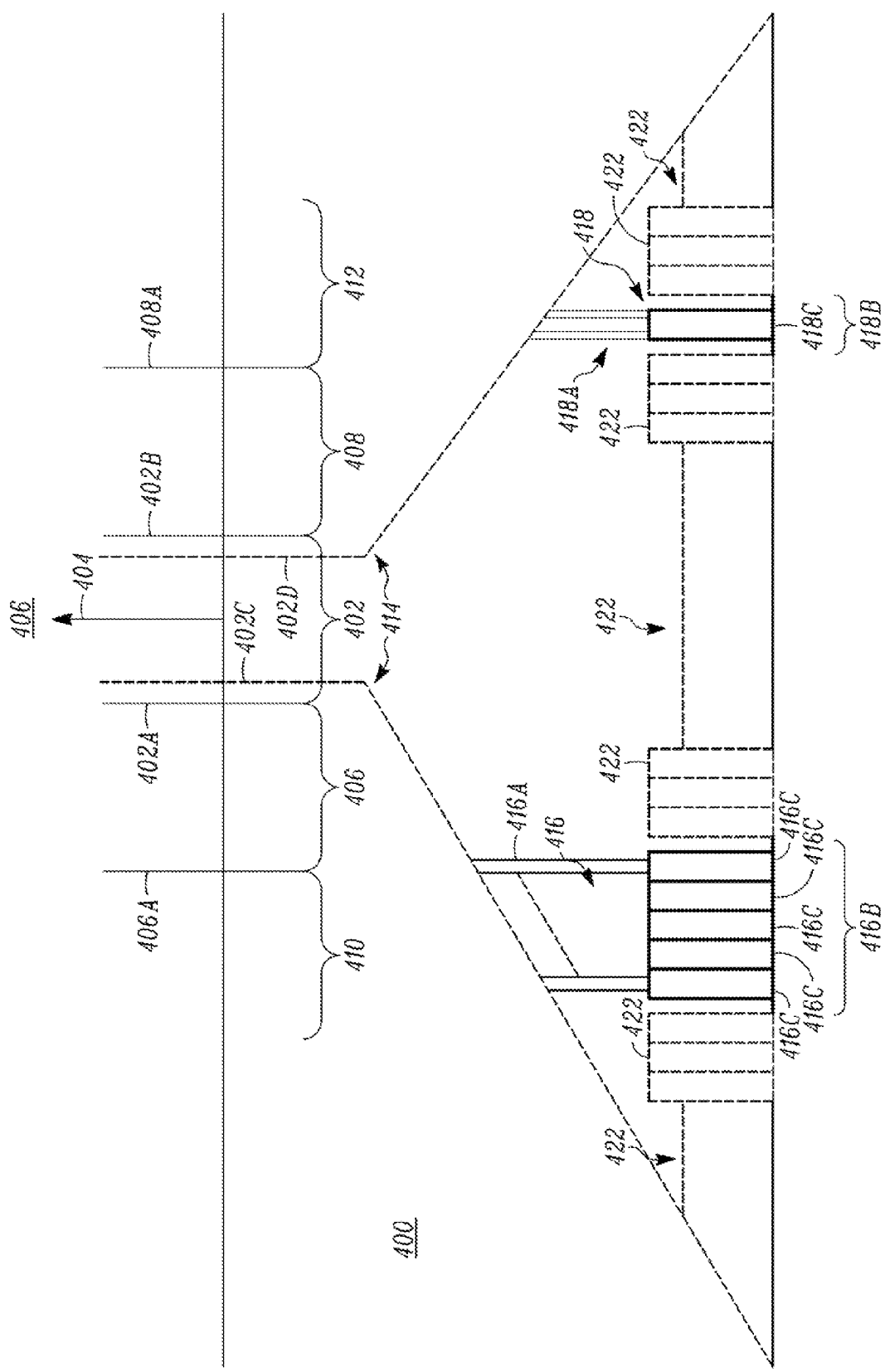
FIG. 4 is a frequency spectrum according to an embodiment of the invention.

Referring still to FIG. 4, an allocatable region 414 of the in-band region 402 lies between the edges 402C and 402D of the first and second guard band regions and, in this example, is 9 MHz wide. Within the allocatable region 414 is a PUSCH signal 416 that occupies a set 416A of subcarriers over a frequency range 416B and a PUCCH signal 418 that occupies a set 418A of subcarriers over a frequency range 418B. The set 416A of subcarriers of the PUSCH is carried by a set 416C of RBs, while the set 418A of the subcarriers of the PUCCH is carried by a single RB 418C. The combination of the set of RBs of the PUSCH and the RB of the PUCCH will be referred to as the "in-band, allocated RBs," as they have been allocated carrying uplink data and control signals. The combined frequency ranges of the subcarriers that the in-band, allocated RBs carry will be collectively referred to as the "allocated region."

Also located in the in-band allocatable region 414 are subcarriers that are carried by RBs 422 that have not been allocated for carrying uplink data and control signals. These RBs will be collectively referred to as "in-band, non-allocated RBs," and the combined frequency ranges of the subcarriers that occupy them will be collectively referred to as the "non-allocated region." The non-allocated RBs 422 depicted in FIG. 4 are only representative, and it is to be understood that there are many more unallocated RBs that occupy the areas that are not occupied by the allocated RBs. In the examples to follow, the set 416A of subcarriers of the PUSCH will be assumed to comprise 60 subcarriers, and the set 416C of RBs allocated to the PUSCH to comprise 5 RBs, with each RB of the set 416C carrying 12 subcarriers. Similarly, the set 418A of subcarriers of the PUCCH will be assumed to comprise 12 subcarriers, the RB 418C allocated to the PUCCH carrying the 12 subcarriers. The number of non-allocated RBs 422 is assumed to be 44 RBs.

Each of the regions 402, 406, 408, 410, 412, and 414 contains signals. The signals generally include those RBs carrying the subcarriers of the PUSCH and PUCCH plus signals that leak into the frequencies of the non-allocated region, the AC regions 406 and 408, and the spurious regions 410 and 412. The power of the signals in the various regions will be referred to as follows: $P_{inband,allocated}$ for the in-band, allocated region, $P_{in\text{-}band,non\text{-}allocated}$, for the in-band, non-allocated region, $P_{AC}$ for the combined AC regions 406 and 408, $P_{spurious}$ for the combined spurious regions 410 and 412.

The reasons for the leakage discussed above vary, and may include imperfections in modulation and in power amplification resulting from, for example, imperfections in the components that make up the modulator and the power amplifier. These imperfections cause impairments during transmit operations of the wireless terminal. These impairments may include carrier leakage, in-phase and quadrature-phase (IQ) gain and phase imbalance, phase noise, and counter IM. To limit interference and improve co-existence between users and technologies, wireless communications standards often set limits on the degree to which such leakage is permitted.

According to an embodiment of the invention, impairments caused by leakage may be modeled. To facilitate a description of such modeling, a functional block diagram shown in FIG. 5 will now be introduced. This diagram will be described in the context of LTE technology. However, many or all of these blocks are applicable to other communication technologies and other embodiments of the invention are applicable thereto. Furthermore, it is to be understood that the blocks in this diagram are intended to represent functionality, and may or may not represent discrete pieces of hardware.

Figure 5:
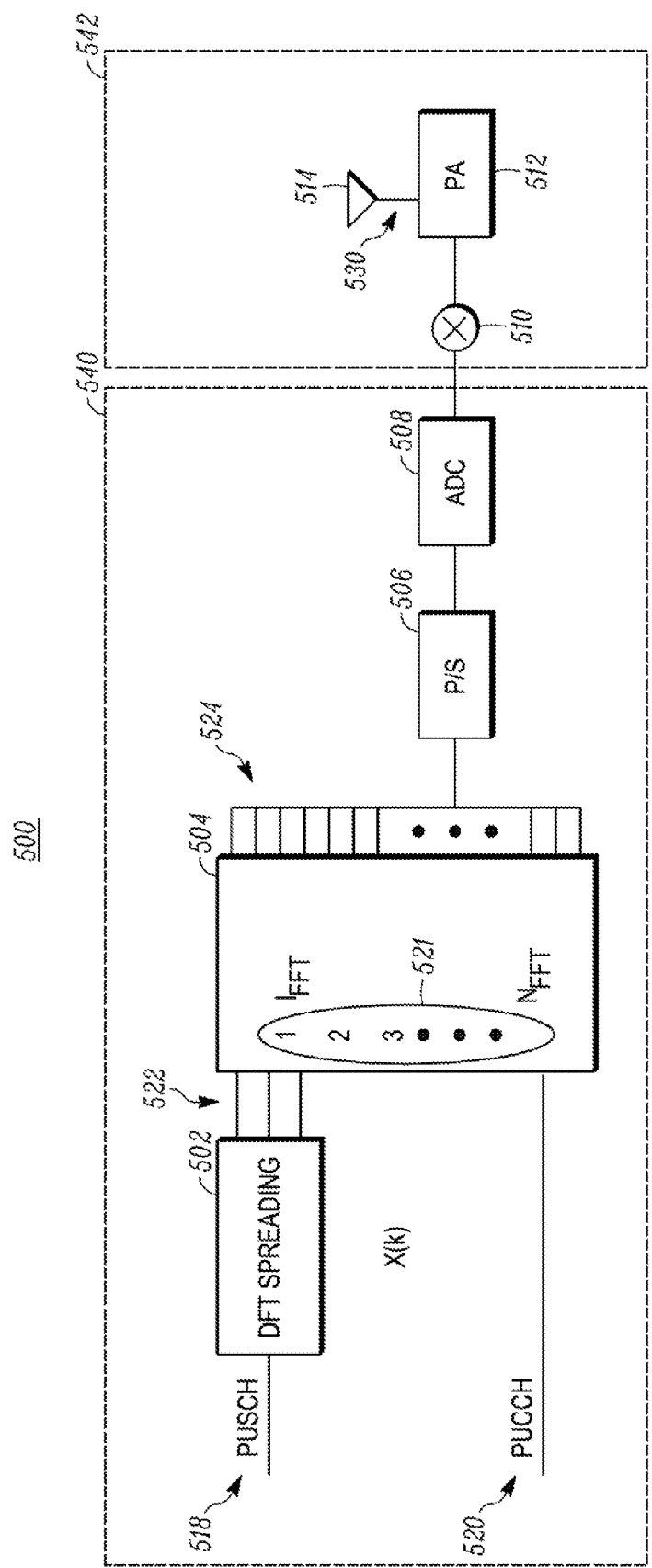
FIG. 5 is a block diagram depicting components and/or functions of a wireless terminal that are used in the processing of signals according to an embodiment of the invention.

In FIG. 5, a signal processing system 500 according to an embodiment of the invention is shown. The system 500 includes a processor 540 communicatively linked to a transceiver 542 (which may be implemented as the controller 220 and the transceiver 210 of FIG. 2). The system 500 also includes a Discrete Fourier Transform (DFT) spreading module 502 and an Inverse Fast Fourier Transform (IFFT) module 504 communicatively linked to the DFT spreading module 502. The system 500 also includes a parallel to serial (P/S) module 506, and analog to digital converter (ADC)

module 508, a modulator 510, a power amplifier (PA) 512 and an antenna 514. The P/S module 506 is communicatively linked to the ADC module 508. The ADC module 508 is communicatively linked to the modulator 510 which, in turn, is communicatively linked to the PA module 512 The PA module 512 is communicatively linked to the antenna 514. The PA module 512 amplifies a signal (such as an uplink signal) that is then transmitted via the antenna 514. The PA 512, as well as any other of the components and/or functions shown in FIG. 5 may be controlled by the controller 220 of FIG. 2.

Referring again to FIG. 5, data and/or control signals are input to the signal processing system 500 on a PUSCH over a first input path 518 and on a PUCCH over a second input path 520. Alternatively, both of the first and second input paths may carry PUSCHs. The PUSCH includes shared channel data and may also include control information. The PUCCH carries control information, such as a channel quality indicator (CQI), scheduling request (SR) and ACK/NACKs of data received from the base unit on downlink channels. According to one embodiment, the control signals of the PUSCH and PUCCH are generated in a baseband processor of a wireless terminal, while the data signals of the PUSCH are generated in an application processor of the wireless terminal. In one implementation, transport blocks are generated in the application processor and provided to the baseband processor. The baseband processor performs channel coding and adds control information. This generally occurs during transmission. When the wireless terminal receives signals from, for example, a base station, the process generally works in reverse.

Both the PUSCH and PUCCH come into the system 500 as complex sequences of symbols. The symbols of the PUSCH are spread in frequency by the DFT spreading module 502 prior to entering the IFFT block 504. The symbols of the PUCCH will ultimately be mapped to a single RB, so no DFT spreading is required. If, however, two PUSCHs are used instead of one PUSCH and one PUCCH on a single component carrier, then the second PUSCH will also pass through the DFT spreading module 502. If a first PUSCH is sent on a first component carrier and a second PUSCH is sent on an adjacent component carrier, then separate DFT's are used for each of the first and second PUSCH.

It is to be noted that the PUCCH may not be carried on the same set of subcarriers in the two slots of a sub-frame. For example, the PUCCH may, in one slot, be carried on a first set of subcarriers, and then, in the following slot, be carried on a second set of subcarriers that are on the other side of the component carrier at a distance from the center frequency of the component carrier equal or nearly equal to the distance to the center frequency of the component carrier as the first set of subcarriers. This pattern may be repeated from slot to slot.

At segments 522, the data and control signal of the PUSCH and PUCCH channels corresponds to $X_1(k)$ in the frequency domain, where k is the subcarrier index with k=0, 1, ..., $12*N_{RB}-1$, where $N_{RB}$ is the total number of RBs in the allocatable uplink (UL) transmission bandwidth (allocatable in-band region 414 of FIG. 4). Each RB has 12 subcarriers. For example, in a 10 MHz LTE deployment, $N_{RB}=50$ and there are $N_{SC}=12*50=600$ subcarriers, where $N_{SC}$ is the number of subcarriers in the allocatable in-band region 414 to which the PUSCH and PUCCH data and control signals may be assigned (i.e., the number of subcarriers in the allocated RBs).

The IFFT module 504 performs an inverse Fourier transform function on the symbols in each of the bins of the PUSCH and PUCCH. The term $N_{FFT}$ represents size of the IFFT and is a function of the bandwidth of the LTE carrier. For a 10 MHz LTE carrier, $N_{FFT}$ is equal to 1024. The $N_{RB}=50$ resource blocks for the 10 MHz LTE carrier map to the center 600 inputs of the IFFT. The remaining 624 inputs of the IFFT are assigned a value of 0, with 212 of the inputs being above and below, respectively, the 600 inputs to which the $N_{RB}=50$ resource blocks may be assigned.

In carrying out functions on the PUSCH and PUCCH sequences of symbols, including the inverse Fourier transform function, the IFFT module 504 receives data symbols spread over multiple subcarriers in the frequency domain and outputs, at segment 524, a vector of time-domain samples of the time-domain signal, which corresponds to the frequency-domain input. This vector of time samples is converted to a complex sequence in the time-domain by the parallel to serial module 506. The signal is then passed to the ADC module 508, where it is converted to an analog signal. The analog signal is then passed to the modulator 510, where it is modulated according to a signal generated by a local oscillator (LO). The modulated signal (RF signal) then passes to the PA 512, where it is amplified and sent to the antenna 514. The antenna 514 then transmits the signal to one or more base units.

An embodiment of the invention will now be described in terms of mathematical equations that represent the various processing that occurs in the system 500. An explanation of how these equations are derived and how they related to various embodiments of the invention will also be given.

It will now be assumed that the signal processing system 500 generates a complex baseband signal z(t) whose real component is x(t). It will also be assumed that x(t) is an input into the PA 512 and is amplified thereby, resulting in an amplified signal y(t). The PA 512 may be modeled as a power series:

$$y(t)=a_1x(t)+a_2x^2(t)+a_3x^3(t)+a_4x^4(t)+a_5x^5(t)+ \ldots$$

As an approximation, only the first, second and the third terms of the power series will be considered in this embodiment, as these first terms are dominant in determining the power spectrum of the PA output (though additional terms of the power series expansion can be included in the analysis). Under this assumption, the output of the PA 512, y(t), can be expressed as follows:

$$y(t)=a_1x(t)+a_2x^2(t)+a_3x^3(t). \qquad [1]$$

In equation [1], $a_1x(t)$ is a linear term, while $a_2x^2(t)$ and $a_3x^3(t)$ are non-linear terms, where the values of the coefficients $a_1$, $a_2$, and $a_3$ represent characteristics of the PA 512. Because the input signal x(t) is, in fact, the real portion of the baseband signal z(t), x(t) can be expressed as:

$$x(t)=Re[z(t)e^{j2\pi f_c t}] \qquad [2]$$

The undesirable components of x(t) include the following: (1) carrier leakage (typically on the order of −28 decibels relative to carrier (dBc)); (2) IQ gain and phase imbalance resulting in a signal image (typically on the order of −28 decibels relative to the carrier (dBc)); (3) counter intermodulation resulting in a second signal image (typically on the order of −50 to −60 decibels relative to the carrier (dBc)); and (4) phase noise. Undesirable component (1) is caused by a mixer (which is part of the modulator 510 in FIG. 5). Undesirable components (2), (3) are caused by the modulator 510, while phase noise (4) is generated in the PA 512. All of these components can be modeled.

In the frequency domain of the complex baseband signal z(t), the effect of IQ gain and phase imbalance can be represented as $Z(k)=\alpha X_1(k)+\beta \overline{X}_1(N-k-1)$, where k denotes the subcarrier index, $\overline{X}_1(N-k-1)$ is the complex conjugate of $X_1(N-k-1)$, $\alpha=\cos\phi+j\epsilon\sin\phi$, $\beta=\epsilon\cos\phi-j\sin\phi$, and $\phi$ and $\epsilon$ are the phase imbalance and gain imbalance of the modulator, respectively. It can be noted that there is a one-to-one mapping between the subcarrier index k and the frequency of the subcarrier which depends on the carrier frequency $f_c$ and the bandwidth of the LTE signal. The magnitude of the parameters $\alpha$ and $\beta$ can be inferred from the specification of the relative power of the IQ image for the modulator 510, where the relative power of the IQ image is given by $$\left\|\frac{\beta}{\alpha}\right\|^2.$$

The index k is in the range $$k = \frac{-N_{FFT}}{2}, \ldots, \frac{N_{FFT}}{2} - 1,$$

where $N_{FFT}$ is the total number of subcarriers in the allocated in-band region (e.g., region 414 in FIG. 4).

With the inclusion of the effect of carrier leakage, the output of the modulator 510 is given by $Z(k)=\alpha X_1(k)+c\delta(k)+\beta\overline{X}_1(N-k-1)$, where the constant c denotes the complex amplitude of the carrier at the modulator output, $\delta(k)=1$ for $k=0$ and $\delta(k)=0$ otherwise, and $c\delta(k)$ is the carrier leakage component.

The counter intermodulation image is a second image signal resulting from a third order non-linearity in the modulator. This counter intermodulation image is on the same side of the carrier frequency as the IQ image, but its center frequency is three times farther from the carrier frequency than the center of the IQ image. Additionally, the counter intermodulation image is three times wider (in frequency) than the IQ image. The counter intermodulation image produced by the modulator 510 may be specified (e.g., by its manufacturer or by the manufacturer of the system 500 or digital signal processor of which it is a part) by its power relative to the signal of which it is an image. The counter intermodulation image can be included in the above analysis in a manner similar to that used above for the IQ image and the carrier leakage by adding the counter intermodulation image to the complex baseband signal Z(k).

Assuming that data symbols transmitted on the subcarriers are uncorrelated and have equal energy, the Power Spectral Density (PSD) of Z(k) is:

$$S_Z(k)=P\times [|\alpha|^2 I_{X_1}(k)+|c|^2\delta(k)+|\beta|^2 I_{X_1}(N-k-1)] \quad [3]$$

where $I_{X_1}(k)$ is an indicator function such that $I_{X_1}(k)=1$ if $X_1(k)$ has non-zero energy on subcarrier $\kappa$, and $I_{X_1}(k)=0$ otherwise; $|\alpha|^2 I_{X_1}(k)$ represents the desired signal; while $|\beta| I_{X_1}(N-k-1)$ represents the image signal. In summary, $S_Z(k)$ is the signal that is at the input to the PA (such as the PA 512 of FIG. 5) and captures the carrier leakage as well as the signal image due to the modulator IQ gain and phase imbalance. The counter intermodulation image can be included in [3] in a manner similar to that used for the IQ image and the carrier leakage by adding the PSD of the counter intermodulation image to $S_Z(k)=1$.

When these equations [1] and [2] are combined and simplified, the relationship between y(t) and z(t) can be expressed as follows:

$$y(t) = \frac{a_2}{2}|z(t)|^2 + \left(a_1 + \frac{3a_3}{4}|z(t)|^2\right)\mathrm{Re}[z(t)e^{j2\pi f_c t}] + \frac{a_2}{2}\mathrm{Re}[z^2(t)e^{j4\pi f_c t}] + \frac{a_3}{4}\mathrm{Re}[z^3(t)e^{j6\pi f_c t}]. \quad [4]$$

In this embodiment, it is assumed that $R_y(\tau)$ and $S_y(f)$, respectively, denote the autocorrelation function and the power spectrum of y(t), and that the power spectrum is defined as the Fourier Transform of the autocorrelation function. The autocorrelation $R_y(\tau)$ is defined as $$R_y(\tau)=E[y(t)\tilde{y}(t-\tau)]$$

where $\tilde{y}$ denotes the complex conjugate of y and $E[\ ]$ is the expectation of the argument computed over the underlying distribution of the argument. The autocorrelation function of y(t) may be expressed in terms of the autocorrelation function of z(t). To begin, it should be noted that the terms of y(t) which are multiplied by different complex exponentials in t are uncorrelated and can be treated independently in the development as long as the magnitude of the bandwidth of z(t) is much less than the value of the carrier frequency $f_c$.

For the first term $$\frac{a_2}{2}|z(t)|^2$$

of y(t), the autocorrelation is defined as the expectation $$E\left\{\left|\frac{a_2}{2}\right|^2|z(t)|^2|\tilde{z}(t-\tau)|^2\right\} = \frac{|a_2|^2}{4}E\{|z(t)|^2|\tilde{z}(t-\tau)|^2\}$$

It is assumed in this embodiment that z(t) is a weakly-stationary, complex-valued, and proper (i.e., circularly symmetric) Gaussian process. With this assumption, the autocorrelation of the first term is then given by $$\frac{|a_2|^2}{4}E\{|z(t)|^2|\tilde{z}(t-\tau)|^2\} = \frac{|a_2|^2}{4}(R_Z^2(0)+|R_Z(\tau)|^2)$$

For the second term $$\left(a_1 + \frac{3a_3}{4}|z(t)|^2\right)\mathrm{Re}[z(t)e^{j2\pi f_c t}]$$

of y(t), it can be shown that $$E\left\{\left(a_1 + \frac{3a_3}{4}|z(t)|^2\right)\mathrm{Re}[z(t)e^{j2\pi f_c t}]\right.$$
$$\left.\left(a_1 + \frac{3a_3}{4}|\tilde{z}(t-\tau)|^2\right)\mathrm{Re}[z(t-\tau)e^{-j2\pi f_c(t-\tau)}]\right\} =$$
$$\left(\frac{|a_1|^2}{2} + \frac{3}{2}\mathrm{Re}(a_1\tilde{a}_3)R_Z(0) + \frac{9|a_3|^2}{16}(2R_Z^2(0)+|R_Z(\tau)|^2)\right)$$
$$\mathrm{Re}(R_Z(\tau)\exp(j2\pi f_c\tau))$$

For the third term $$\frac{a_2}{2}\text{Re}[z^2(t)e^{j4\pi f_c t}]$$

of y(t), it can be shown that $$E\left\{\frac{a_2}{2}\text{Re}[z^2(t)e^{j4\pi f_c t}]\frac{\tilde{a}_2}{2}\text{Re}[z^2(t-\tau)e^{j4\pi f_c(t-\tau)}]\right\} = \frac{|a_2|^2}{2}\text{Re}(R_Z^2(\tau)\exp(j4\pi f_c\tau))$$

Finally, for the fourth term $$\frac{a_3}{4}\text{Re}[z^3(t)e^{j6\pi f_c t}]$$

of y(t), it can be shown that $$E\left\{\frac{a_3}{4}\text{Re}[z^3(t)e^{j6\pi f_c t}]\frac{\tilde{a}_3}{4}\text{Re}[z^3(t-\tau)e^{j6\pi f_c(t-\tau)}]\right\} = \frac{3}{16}|a_3|^2\text{Re}(R_Z^3(\tau)\exp(j6\pi f_c\tau))$$

Combining the above four terms, the autocorrelation of y(t) can be expressed as $$R_y(\tau) = \frac{|a_2|^2}{4}(R_Z^2(0) + |R_Z(\tau)|^2) + \left(\begin{array}{c}\frac{|a_1|^2}{2} + \frac{3}{2}\text{Re}(a_1\tilde{a}_3)R_Z(0) + \\ \frac{9|a_3|^2}{16}(2R_Z^2(0) + |R_Z(\tau)|^2)\end{array}\right)\text{Re}(R_Z(\tau)\exp(j2\pi f_c\tau)) + \frac{|a_2|^2}{2}\text{Re}(R_Z^2(\tau)\exp(j4\pi f_c\tau)) + \frac{3}{16}|a_3|^2\text{Re}(R_Z^3(\tau)\exp(j6\pi f_c\tau))$$ [5]

The power spectral density $S_y$(f) of y(t) is the Fourier Transform of the autocorrelation function $R_y(\tau)$. The power spectral density for y(t) can be expressed as $$S_y(f) = \frac{|a_2|^2}{4}R_Z^2(0)\delta(f) + \frac{|a_2|^2}{4}S_Z(f)\otimes S_Z(-f) + \frac{1}{2}\left(\frac{|a_1|^2}{2} + \frac{3}{2}\text{Re}(a_1\tilde{a}_3)R_Z(0) + \frac{9|a_3|^2}{8}R_Z^2(0)\right)(S_Z(f-f_c) + S_Z(-f-f_c)) + \frac{9|a_3|^2}{32}\left(\begin{array}{c}S_Z(f-f_c)\otimes S_Z(f)\otimes S_Z(-f) + \\ S_Z(-f-f_c)\otimes S_Z(f)\otimes S_Z(-f)\end{array}\right) + \frac{|a_2|^2}{4}(S_Z(f-2f_c)\otimes S_Z(f) + S_Z(-f-2f_c)\otimes S_Z(-f)) + \frac{3}{32}|a_3|^2\left(\begin{array}{c}S_Z(f-3f_c)\otimes S_Z(f)\otimes S_Z(f) + \\ S_Z(-f-3f_c)\otimes S_Z(-f)\otimes S_Z(-f)\end{array}\right).$$ [6]

where the symbol $\otimes$ denotes convolution. The coefficients $a_1$, $a_2$ and $a_3$ in [1] are real-valued numbers. Therefore, Re $(a_1\tilde{a}_3) = a_1 a_3$, $|a_j|^2 = a_j$, j=1, 2, 3 in the above equation.

Since the power spectral density $S_y$(f) is symmetric with respect to zero frequency, and furthermore, since the component centered at zero frequency is not of interest from the perspective of restricting emissions of the device, it is sufficient to define the one-sided Power Spectral Density $S_y^+$(f) as twice the positive frequency power spectrum (excluding components near zero frequency), which is given by $$S_y(f) = \left(\frac{|a_1|^2}{2} + \frac{3}{2}\text{Re}(a_1\tilde{a}_3)R_Z(0) + \frac{9|a_3|^2}{8}R_Z^2(0)\right)S_Z(f-f_c) + \frac{9|a_3|^2}{16}S_Z(f-f_c)\otimes S_Z(f)\otimes S_Z(-f) + \frac{|a_2|^2}{2}S_Z(f-2f_c)\otimes S_Z(f) + \frac{3}{16}|a_3|^2 S_Z(f-3f_c)\otimes S_Z(f)\otimes S_Z(f)$$ [7]

In this embodiment, the PSD of the component of the signal at the output of the PA 512 centered at the carrier frequency is equal to $$\left(\frac{|a_1|^2}{2} + \frac{3}{2}\text{Re}(a_1\tilde{a}_3)R_Z(0) + \frac{9|a_3|^2}{8}R_Z^2(0)\right)S_Z(f-f_c) + \frac{9|a_3|^2}{16}S_Z(f-f_c)\otimes S_Z(f)\otimes S_Z(-f)$$

where $$\left(\frac{|a_1|^2}{2} + \frac{3}{2}\text{Re}(a_1\tilde{a}_3)R_Z(0) + \frac{9|a_3|^2}{8}R_Z^2(0)\right)S_Z(f-f_c)$$

denotes the desirable component of the power spectrum. The adjacent channel leakage is determined primarily by the power spectrum component $$\frac{9|a_3|^2}{16}S_Z(f-f_c)\otimes S_Z(f)\otimes S_Z(-f).$$

The spurious emissions are determined by the power spectrum component at the second harmonic $$\frac{|a_2|^2}{2}S_Z(f-2f_c)\otimes S_Z(f)$$

and the power spectrum component at the third harmonic $$\frac{3}{16}|a_3|^2 S_Z(f-3f_c)\otimes S_Z(f)\otimes S_Z(f)$$

The wireless terminals (from FIG. 1) can thus compute the $P_{inband,allocated}$, the $P_{inband,non-allocated}$ the $P_{AC}$, and the $P_{spurious}$ by using the appropriate range of frequencies (or equivalently appropriate index values of k for the subcarriers in these regions) and applying equation [7] as illustrated below.

The wireless terminal can compute $P_{inband,allocated}$, $P_{inband,non-allocated}$, $P_{AC}$, and $P_{spurious}$ by integrating the PSD estimate $S_y^+$(f) of the output of the PA at the carrier frequency $f_c$ over the appropriate frequency range:

$$P_{inband,allocated} = \int_{f_c-(\Delta f_{alloc}/2)}^{f_c+(\Delta f_{alloc}/2)} S_y^+(f) I_{allocated}(f) df$$

where the indicator function $I_{allocated}(f)=1$ is equal if the frequency is allocated and $I_{allocated}(f)=0$, otherwise. It should be noted that the allocated region is a portion of the in-band region 402:

$$P_{inband,non-allocated} = \int_{f_c-(\Delta f_{inband}/2)}^{f_c+(\Delta f_{inband}/2)} S_y^+(f) df - P_{inband,allocated}$$

where $[-\Delta f_{in-band}/2, \Delta f_{in-band}/2]$ defines the in-band region.

The adjacent channel leakage power on the positive (+) side and negative (−) side can be expressed as $$P_{AC+} = \int_{f_c+\Delta f_{inband}/2}^{f_c+\Delta f_{OOB}} S_y^+(f) df$$

$$P_{AC-} = \int_{f_c-\Delta f_{OOB}}^{f_c-\Delta f_{inband}/2} S_y^+(f) df$$

The maximum spurious emissions power on the positive (+) and negative (−) side can be expressed as $$P_{spurious+} = \max\{S_y^+(f): f > f_c + (\Delta f_{inband}/2) + \Delta f_{OOB}\}$$

$$P_{spurious-} = \max\{S_y^+(f): f < f_c - (\Delta f_{inband}/2) - \Delta f_{OOB}\}$$

Instead of computing the maximum of the power spectrum point-wise, there may be a measurement bandwidth associated with computation of the spurious emissions power (e.g. 100 kHz for 30 MHz ≤ $f_c$ < 1 GHz).

It should be noted that in some cases there are some number of exceptions to the spurious requirement that are allowed, and thus the spurious definition may sometimes be modified to exclude the largest in values from the maximum.

The integrals above can be computed numerically by summing the subcarrier-quantized PSD estimates. For example, the in-band power can be approximated by, $$P_{inband,allocated} = \int_{f_c-(\Delta f_{alloc}/2)}^{f_c+(\Delta f_{alloc}/2)} S_y^+(f) I_{allocated}(f) df \approx \Delta f \sum_{k=-N_{SC}/2}^{k=+N_{SC}/2} S_y^+(k\Delta f) I_{allocated}(k\Delta f)$$

where $\Delta f = 15$ kHz or the subcarrier bandwidth. The other terms may be computed by numerical integration in a similar fashion.

Subsequently, the wireless terminal can compute $$P_{inband,non-allocated}/P_{inband,allocated}$$

$$P_{AC}/P_{inband,allocated}$$

$$P_{spurious}/P_{inband,allocated}$$

Figure 6:
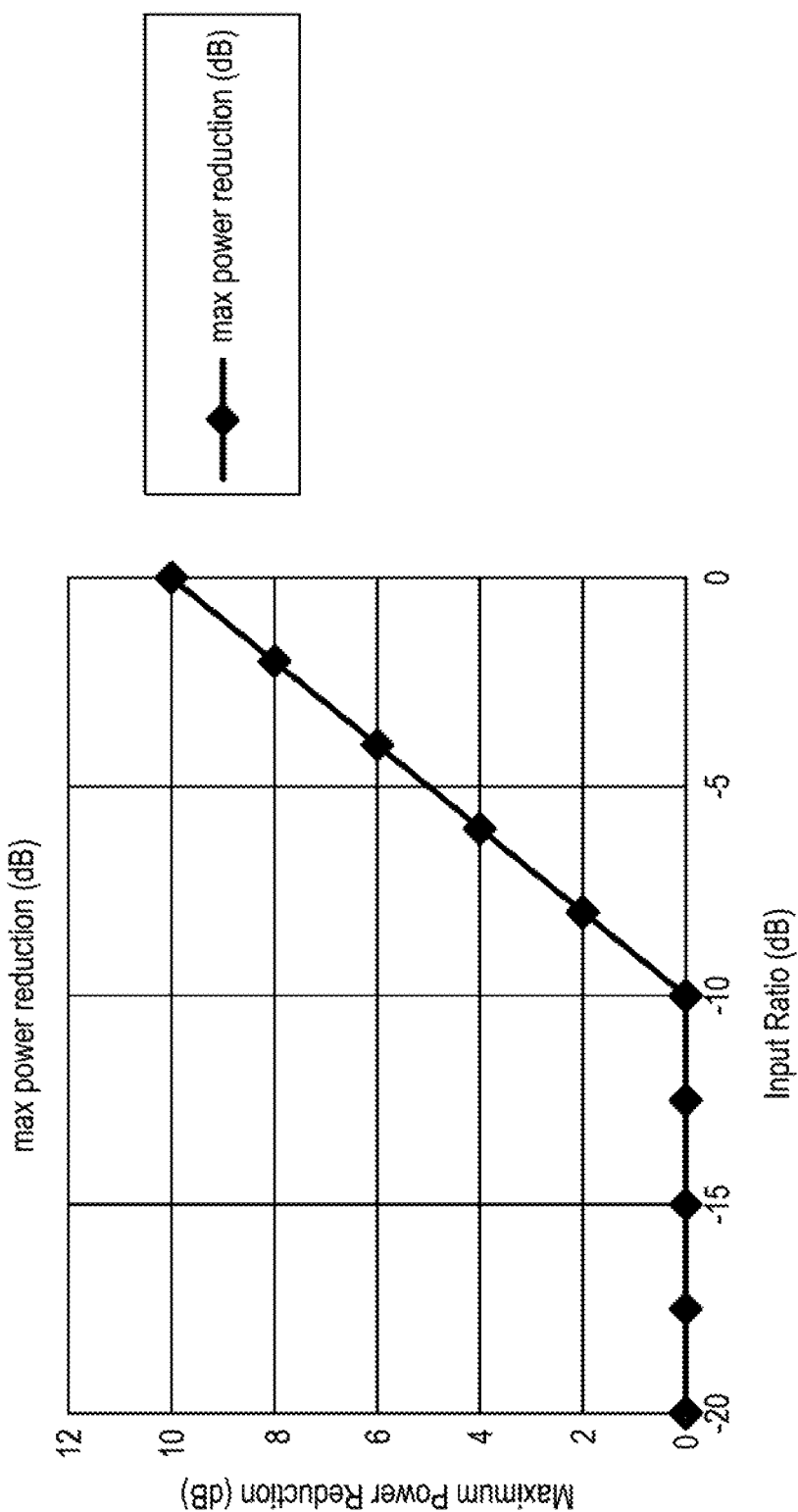
FIG. 6 is a graph illustrating a mapping function according to an embodiment of the invention.

The wireless terminal can use mapping functions to determine a power reduction (PR) value applicable to each of these ratios:

$$PR_{EVM} = f_{EVM}(P_{inband,non-allocated}/P_{inband,allocated})$$

$$PR_{AC} = f_{AC}(P_{AC}/P_{inband,allocated})$$

$$PR_{spurious} = f_{spurious}(P_{spurious}/P_{inband,allocated})$$

where $f_{EVM}$ is a mapping function that maps the ratio $P_{inband,non-allocated}/P_{inband,allocated}$ to an EVM back off power specified in a standard, $f_{AC}$ is a mapping function that maps the ratio $P_{AC}/P_{inband,allocated}$ to an AC back off power specified in a standard, and $f_{spurious}$ is a mapping function that maps the ratio $P_{spurious}/P_{inband,allocated}$ to a spurious back off power specified in a standard. The mapping function indicates a reduction in the maximum transmit power, also known as a maximum power reduction, which the wireless terminals 103 and 104 are allowed to apply in order to meet emissions constraints. The input to the mapping function includes at least one of the ratios $P_{inband,non-allocated}/P_{inband,allocated}$, $P_{AC}/P_{inband,allocated}$ and $P_{spurious}/P_{inband,allocated}$ and may also include the parameters $a_2$, $a_3$, $\alpha$, and $\beta$, as well as the carrier leakage $c\delta(k)$. An example of such a mapping is shown in FIG. 6. The vertical axis indicates the maximum power reduction that may be applied by the wireless terminal, while the horizontal axis denotes the ratio of undesired power to desired power. It should be noted that when the input argument is below a threshold value, it is possible that no maximum power reduction will be applied. The value of the slope of the line in FIG. 6 is generally less than or equal to 1, where the slope is defined as the change in the allowed maximum power reduction over the change in the input ratio.

The maximum transmit back off power can be computed as the maximum of the three values:

$$PR = \max\{PR_{EVM}, PR_{AC}, PR_{spurious}\}$$

In short, each of the ratios $P_{inband,non-allocated}/P_{inband,allocated}$, $P_{AC}/P_{inband,allocated}$, and $P_{spurious}/P_{inband,allocated}$ may be computed based on the values of $a_2$, $a_3$, $\alpha$, and $\beta$. The value of $a_3$ may be a known characteristic of the PA 512, while the values of $\alpha$ and $\beta$ are based on $\phi$ and $\epsilon$, which are the phase imbalance and gain imbalance of the modulator 510 and may be known characteristics of the modulator 510. Alternatively, the values of $\alpha$ and $\beta$ may be determined from the modulator specification, if known. Using these ratios, $PR_{EVM}$, $PR_{AC}$ and $PR_{spurious}$ can be obtained from functions $f_{EVM}$, $f_{AC}$, and $f_{spurious}$, and in an embodiment of the invention, the wireless terminal analytically computes these ratios for a given PA. The wireless terminal sets the amount that it backs off its transmit power so that it exceeds each of the ratios thereby satisfying the most stringent limit.

To account for the possible alternating nature of the PUCCH RBs (described above), the above-described equations may take an average of the power of the leakage signals in the first and second set of subcarriers of the PUCCH, or may take the worst (highest) of the two leakage signal powers.

The determination of PR described above may be performed by one or more of the wireless terminals 103 and 104 and the base stations 101 and 102. The wireless terminals can perform the calculation based on actual values of $a_2$, $a_3$, $\alpha$, $\beta$, etc. and determine the necessary power reduction to meet certain in-band, adjacent channel and OOB emissions constraints for a given resource allocation. The base station can perform the calculation based on worst-case values of $a_2$, $a_3$, $\alpha$, $\beta$, etc. and determine the maximum power reduction that a wireless terminal is allowed to apply for a given resource allocation. For example, if a −28 dBc requirement on the IQ image is specified by a communication standard (e.g., 3GPP TS 36.101 V10.6.0), worst-case parameters $\alpha$ and $\beta$ that meet the requirement can be deduced. The spurious emissions requirements may also imply a certain worst-case values for $a_2$ and $a_3$. One or more of the base stations 101 and 102 can apply suitable models to accommodate other non-linearities such as phase noise, carrier-frequency offset, etc.

The knowledge of the maximum power reduction calculated at the base station allows the base station to select a suitable transport block size (TBS), a Resource Allocation (RA) size, an UL power control setting (for example, a power up/down command sent through Downlink Control Information (DCI)), etc. to ensure that the UL can be closed (i.e. the UL transmission can be received at the base station with sufficient reliability).

Additionally, the wireless terminal may transmit the calculated PR to the base station. Also, the wireless terminal may transmit one or more of the values (e.g., the actual values) of $a_2$, $a_3$, $\alpha$, $\beta$, etc. to the base station. The base station may then calculate the PR (e.g., the maximum or necessary PR) as described above based on the received values and allocate resources or configure commands the base station sends to the wireless terminal, e.g., commands indicating that the wireless terminal should increase or decrease its transmit power.

In an embodiment of the invention, a similar methodology to that described above can be applied to meeting emissions constraints near the second harmonic, third harmonic, fourth harmonic, fifth harmonic, etc. As noted above the input-output relationship for the PA 512 in various embodiments is:

$$y(t) = \frac{a_2}{2}|z(t)|^2 + \left(a_1 + \frac{3a_3}{4}|z(t)|^2\right)\mathrm{Re}[z(t)e^{j2\pi f_c t}] + \frac{a_2}{2}\mathrm{Re}[z^2(t)e^{j4\pi f_c t}] + \frac{a_3}{4}\mathrm{Re}[z^3(t)e^{j6\pi f_c t}]$$

The PSD of the signal $$\frac{a_3}{4}z^3(t),$$

which appears at the third harmonic of the carrier frequency, can also be expressed as a second order convolution under the same assumptions on z(t). Specifically, the PSD of the signal component centered at 3*fc can be written as:

$$\frac{3}{16}|a_3|^2 S_Z(f - 3f_c) \otimes S_Z(f) \otimes S_Z(f)$$

thereby allowing the wireless terminal to estimate the power level of the emissions near the third harmonic of the carrier frequency. In certain implementations of LTE, such as set forth in TS 36.101, the emissions near the third harmonic fall into the spurious emissions domain. Thus, the wireless terminal can compute the spurious emissions power level at both the first harmonic (as previously noted) and the spurious emissions power level at the third harmonic as below.

$$PR_{spurious}^{(fc)} = f_{spurious}^{(fc)}(P_{spurious}^{(fc)}/P_{inband,allocated})$$

$$PR_{spurious}^{(3fc)} = f_{spurious}^{(3fc)}(P_{spurious}^{(3fc)}/P_{inband,allocated}),$$

where $f_{spurious}^{(fc)}(\bullet)$ is the mapping function that maps the estimated power spur level to a power reduction needed to meet certain emissions requirements at the first harmonic, and $f_{spurious}^{(3fc)}(\bullet)$ is the mapping function that maps the estimated power level to a power reduction needed to meet certain different emissions requirements at the third harmonic.

The wireless terminal can compute the required power reduction to meet emissions constraints over in-band, OOB, spurious emissions domain near the first harmonic, and spurious emissions domain near the third harmonic by calculating $$PR = \max\{PR_{EVM}, PR_{AC}, PR_{spurious}^{(fc)}, PR_{spurious}^{(3fc)}\}$$

In an embodiment of the invention, this method can be extended to include, for example, the emissions at the second, fourth and fifth harmonics.

According to an embodiment of the invention, the above-described method of obtaining values of PR while taking into account emissions at different harmonics can be unified into a single framework per the following process:

compute a convolution of a first function A(f) and a second function B(f)

compute a PR based on the said convolution compute a configured maximum power ($P_{CMAX}$) (which will be discussed below) based on the PR compute n transmit power for an UL signal, wherein the UL signal is one of a PUSCH, PUCCH, SRS, and RACH, based on $P_{CMAX}$.

For the first harmonic, $A(f) = S_Z(f)$ and $B(f) = \mathrm{conv}(S_Z(f), S_Z(-f))$ For the third harmonic, $A(f) = S_Z(f)$ and $B(f) = \mathrm{conv}(S_Z(f), S_Z(f))$ Of course, these steps may be performed in various orders.

In an embodiment of the invention, each of the power ratios $P_{inband,non-allocated}/P_{inband,allocated}$, $P_{AC}/P_{inband,allocated}$, and $P_{spurious}/P_{inband,allocated}$ may be determined based on $S_Z(f)$, which may be computed based on the value of $a_n$, $\alpha$, and $\beta$, where $a_n$ is the coefficient of the nth harmonic. The value of $a_n$ may be a known characteristic of the PA, while the values of $\alpha$ and $\beta$ are based on $\phi$ and $\epsilon$, which are the phase imbalance and gain imbalance of the modulator and may be known characteristics of the modulator.

In computing the convolution of several functions, it should be noted that the mathematical operation of convolution is both associative and commutative. Thus, for arbitrary functions A(f), B(f), and C(f) the following relations always hold $$A(f) \otimes B(f) = B(f) \otimes A(f)$$

and more generally $$A(f) \otimes B(f) \otimes C(f) \equiv (A(f) \otimes B(f)) \otimes C(f)$$
$$\equiv (A(f) \otimes C(f)) \otimes B(f)$$
$$\equiv (B(f) \otimes A(f)) \otimes C(f)$$
$$\equiv (B(f) \otimes C(f)) \otimes A(f)$$
$$\equiv (C(f) \otimes A(f)) \otimes B(f)$$
$$\equiv (C(f) \otimes B(f)) \otimes A(f)$$

It can be noted that that the mapping functions described above may depend on the required protection level for each of the regions. It should also be noted that the method described here applies to both multi-cluster transmissions and to scenarios such as those specified for LTE Band 26 in which the LTE carrier is a variable frequency distance from the protected region and the allowed power reduction may be parameterized as a function of this variable frequency distance.

There are many ways in which various embodiments of the invention may use the PR information discussed above. Some possible ways will be described in the following paragraphs. In one embodiment, the PR information is a value that is based on the modulation scheme used by the wireless terminal and the bandwidth of the channel (e.g., the in-band region width) and based on the various imperfect conditions described above.

PR may be used to determine $P_{CMAX}$, which is the maximum permitted transmit power for the wireless terminal. $P_{CMAX}$ must be higher than or equal to $P_{CMAX\_L}$ and lower than or equal to $P_{CMAX\_H}$, which take into account a certain amount of tolerance of the system. $P_{EMAX}$ is a maximum allowed transmit power of the wireless terminal that depends on the power class of the wireless terminal. $P_{CMAX\_L}=\text{MIN }\{P_{EMAX}-\Delta T_C, P_{PowerClass}-\text{PR}-\Delta T_C\}$, where $P_{PowerClass}$ is the maximum transmit power of the wireless terminal without taking into account tolerance in the system, $\Delta T_C$ is a value specified in the LTE standard and $P_{CMAX\_H}=\text{MIN }\{P_{EMAX}, P_{PowerClass}\}$.

In an embodiment of the invention, the wireless terminal of FIG. 1 computes a $P_{CMAX}$ applicable to subframe n based on whether or not there is a simultaneous transmission of PUSCH on another set of uplink resources, whether or not there is a simultaneous PUCCH or SRS transmission, whether or not there is power back off (denoted by "Maximum Power Reduction (MPR)" or "additional maximum power reduction (A-MPR)") associated with a higher order modulation (16 QAM, 64 QAM, 256 QAM), and/or the amount of out-of-band and spurious emissions.

As noted above, the value of $P_{CMAX}$ is at least partially based on the MPR. MPR is the maximum amount that a wireless terminal is permitted to reduce its transmit power. MPR may be determined in a variety of ways, some of which will be described below.

In an embodiment of the invention, $P_{CMAX}$ may be used to determine the power of the uplink signal PUSCH on sub-frame i, referred to as $P_{PUSCH}(i)$. In this embodiment, $P_{PUSCH}(i)$ is calculated in dB as $$P_{PUSCH}(n) = \min\left\{\begin{array}{l} P_{CMAX}(n), \\ 10\log_{10}(M_{PUSCH}(n)) + P_{O\_PUSCH} + \alpha \cdot PL + \Delta_{TF}(i) + f(i) \end{array}\right\},$$

where $P_{PUSCH}(n)$ is the PUSCH transmit power in uplink sub-frame i, $P_{CMAX}(n)$ is the configured maximum transmit power, $M_{PUSCH}(n)$ is the bandwidth of the PUSCH resource assignment in sub-frame n, $P_{O\_PUSCH}$ is the PUSCH power offset configured by higher layers, $\alpha$ is the fractional power control coefficient configured by higher layers, PL is the path loss associated with the base station-wireless terminal link, $\Delta_{TF}(i)$ is the power control delta associated with transmitting either UCI [uplink control information] or uplink shared channel (UL SCH) on PUSCH as configured by higher layers, and $f(i)$ is the power term when power control accumulation is enabled for sub-frame n when sub-frame n happens to be the i-th sub-frame since accumulation was reset.

In the above equations, i is the number of sub-frames over which power offsets derived from transmit power control (TPC) commands were accumulated. Therefore, $i=n-n_{RESET}$ where, $n_{RESET}$ is the sub-frame index of the sub-frame where power accumulation due to TPC commands was last reset. The TPC commands are transmitted in downlink control information (DCI) transported over PDCCH. The serving base station can transmit a TPC command applicable to loop 1 on sub-frame (n–k) where for example k=4 or k=6. In one embodiment, the TPC command is included in PDCCH with DCI format 0 for serving base station c or is jointly coded with other TPC commands in PDCCH with DCI format 3/3A whose CRC parity bits are scrambled with TPC-PUSCH-RNTI. Upon receiving the TPC command, the wireless terminal applies the closed-loop power control update:

$$f(i)=f(i-1)+\delta_{PUSCH}(i-K_{PUSCH})$$

where $\delta_{PUSCH, loop\ j}$ is determined based on the TPC command applicable to loop j and $K_{PUSCH}=4$ or 6.

According to an embodiment of the invention, the wireless terminal can use $P_{CMAX}$ (which, as noted above, is based in part on MPR) to compute power headroom (PH):

$$PH(n)=P_{CMAX}(n)-\{10\log_{10}(M_{PUSCH}(n))+P_{O\_PUSCH}+\alpha\cdot PL+\Delta_{TF}(i)+f(i)\}.$$

The wireless terminal reports PH to the base station in a PH report (PHR). In LTE Rel-10, for example, PHR and Pcmax are both reported for a component carrier in the configured subframes.

In "virtual PHR reporting," an aggressor UE can be configured to compute and transmit PHR on a subframe for a given component carrier even when it is not transmitting PUSCH on that subframe in that component carrier. For the purpose of PHR computation, the wireless terminal assumes a certain reference resource (an allocation of a certain size, RB start location, etc.) in its PHR computation.

As noted previously, the output of the PA 512 can be modeled as [8]

$$y(t)=a_1x(t)+a_2x^2(t)+a_3x^3(t)+a_4x^4(t)+a_5x^5(t)+\ldots$$

According to an embodiment of the invention, the power of leakage signals transmitted in the ACLR regions by a wireless terminal (FIG. 1) is primarily represented by the third order term $a_3x_{3(t)}$ of equation [8]. On the other hand, the power of leakage signals transmitted in the spurious regions by a wireless terminal is primarily represented by the fifth order term $a_5x_{5(t)}$ of equation [8]. Thus, for modeling the output of PA 512 in both the ACLR region and in the spurious region, the following equation may be used:

$$y(t)=a_1x(t)+a_2x^2(t)+a_3x^3(t)+a_4x^4(t)+a_5x^5(t)$$

Under some Gaussian assumptions, the power spectrum at the carrier frequency $f_c$ due to the third order term is proportional to $$S_3(f)=S(f-f_c)\otimes S(f)\otimes S(-f)$$

where $\otimes$ denotes convolution and $S(f)$ is the power spectrum for the allocation at the output of the modulator.

In addition to the desired allocation, $S(f)$ includes contributions from impairments such as LO leakage, IQ image, counter IM3. In addressing only general emissions requirements such as the general spectral emissions mask (SEM), $UTRA_{ACLR1}$, $UTRA_{ACLR2}$, $E-UTRA_{ACLR}$, and the general spurious emissions requirements, it may not be necessary to include the modulator impairments in $S(f)$. It can be noted that, in this embodiment, the third order term given above does not reach beyond the ACLR region, and thus does not impact the spurious domain.

In this embodiment, only odd order terms contribute to emissions in the ACLR region, but all non-linear terms contribute to emissions in the spurious domain, either in the neighborhood of the carrier frequency $f_c$, or at a harmonic of this frequency. Even order terms do not contribute to spurious emissions in the neighborhood of the carrier frequency, and as a result, in this region, the dominant contribution to spurious emissions is due to the fifth order term. Under some Gaussian assumptions, the power spectrum at the carrier frequency $f_c$ due to the fifth order term is proportional to $$S_5(f)=S(f-f_c)\otimes S(f)\otimes S(-f)\otimes S(f)\otimes S(-f)$$

As noted above, the dominant contribution to the ACLR region is the third order term of the PA non-linearity, the spectrum of which was defined above as $$S_3(f) = s(f-f_c) \otimes S(f) \otimes S(-f)$$

where S(f) is the power spectrum at the output of the modulator.

Before proceeding, the term "allocation ratio" will be defined. Allocation ratio refers to the ratio of the number of RBs allocated to the wireless terminal for uplink to the total number of allocatable RBs. For example, in LTE, the maximum number of RB's is a function of the LTE carrier bandwidth. For 1.4, 3, 5, 10, 15, and 20 MHz, the maximum number (or allocatable RB's) is 6, 15, 25, 50, 75, and 100, respectively.

According to an embodiment of the invention, the following ACLR metrics for each allocation ratio may be defined.

$$\gamma_{UTRA_{ACLR1}} = \max(\int_{UTRA_{ACLR1,LEFT}} S_3(f)df, \int_{UTRA_{ACLR1,RIGHT}} S_3(f)df)$$

$$\gamma_{UTRA_{ACLR2}} = \max(\int_{UTRA_{ACLR2,LEFT}} S_3(f)df, \int_{UTRA_{ACLR2,RIGHT}} S_3(f)df)$$

$$\gamma_{E-UTRA_{ACLR}} = \max(\int_{E-UTRA_{ACLR,LEFT}} S_3(f)df, \int_{E-UTRA_{ACLR,RIGHT}} S_3(f)df).$$

The above ACLR metrics can be combined into a single ACLR metric as follows $$\gamma_{ACLR} = \max(2 \cdot \gamma_{UTRA_{ACLR1}}, 4 \cdot \gamma_{UTRA_{ACLR2}}, \gamma_{E-UTRA_{ACLR}}),$$

where the weightings of 2 and 4 are used to account for the fact that the $UTRA_{ACLR1}$ and $UTRA_{ACLR2}$, requirements are 3 and 6 dB tighter, respectively, than the $E\text{-}UTRA_{ACLR1}$ requirement.

Figure 7:
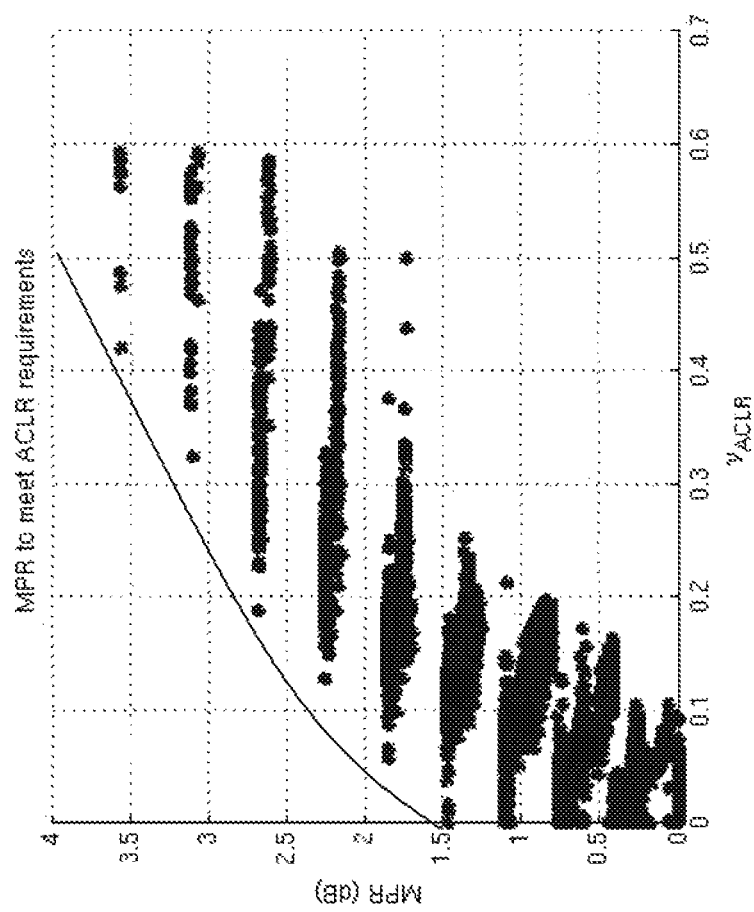
FIGS. 7 and 8 are mappings of MPR versus various metrics according to an embodiment of the invention.

An example of a map of the MPR needed to meet all ACLR requirements as a function of $\gamma_{ACLR}$ is shown in FIG. 7. In this mapping, the parameter $\gamma_{ACLR}$ is computed using an approximation method in which each multi-cluster uplink allocation is represented as a vector of length $N_{RB}$ (where $N_{RB}$ is the number of allocatable RB's for the given bandwidth—in this example, $N_{RB}=100$) in which the i-th element of the vector corresponds to the i-th RB. If the i-th RB is not allocated, the i-th element of the vector is set to 0. If the i-th element of the RB is allocated, then the value of the i-th element is set to $1/N_{RB\_alloc}$ where $N_{RB\_alloc}$ is the number of allocated RB's. With this representation, the power of each multi-cluster allocation is unity regardless of the number of allocated RB's.

According to an embodiment of the invention, discrete frequency-domain convolutions starting with the above normalized allocation vector are used to compute $S_3$ (f), which is then used to evaluate the integrals for $\gamma_{UTRA_{ACLR1}}$, $\gamma_{UTRA_{ACLR2}}$, and $\gamma_{E-UTRA_{ACLR}}$. The resulting values for $\gamma_{UTRA_{ACLR1}}$, $\gamma_{UTRA_{ACLR2}}$, and $\gamma_{E-UTRA_{ACLR}}$ are approximations.

As noted above, the third order term of the PA non-linearity does not contribute to the spurious domain, nor does it contribute to the spectral region covered by the outer 5 MHz of the general E-UTRA spectral emissions mask (Table 1).

TABLE 1

| Spectrum emission limit (dBm)/Channel bandwidth | | | | | | | |
|---|---|---|---|---|---|---|---|
| $\Delta f_{OOB}$ (MHz) | 1.4 MHz | 3.0 MHz | 5 MHz | 10 MHz | 15 MHz | 20 MHz | Measurement bandwidth |
| ±0-1 | −10 | −13 | −15 | −18 | −20 | −21 | 30 kHz |
| ±1-2.5 | −10 | −10 | −10 | −10 | −10 | −10 | 1 MHz |

TABLE 1-continued

| Spectrum emission limit (dBm)/Channel bandwidth | | | | | | | |
|---|---|---|---|---|---|---|---|
| $\Delta f_{OOB}$ (MHz) | 1.4 MHz | 3.0 MHz | 5 MHz | 10 MHz | 15 MHz | 20 MHz | Measurement bandwidth |
| ±2.5-2.8 | −25 | −10 | −10 | −10 | −10 | −10 | 1 MHz |
| ±2.8-5 |  | −10 | −10 | −10 | −10 | −10 | 1 MHz |
| ±5-6 |  | −25 | −13 | −13 | −13 | −13 | 1 MHz |
| ±6-10 |  |  | −25 | −13 | −13 | −13 | 1 MHz |
| ±10-15 |  |  |  | −25 | −13 | −13 | 1 MHz |
| ±15-20 |  |  |  |  | −25 | −13 | 1 MHz |
| ±20-25 |  |  |  |  |  | −25 | 1 MHz |

The dominant contribution in this region is due to the 5th order term of the PA non-linearity, for which the spectral response is proportional to $$S_5(f) = S(f-f_c) \otimes S(f) \otimes S(-f) \otimes S(f) \otimes (-f)$$

The following metrics for the spurious regions may be defined:

$$\beta_{spurious1} = \max\{\int_{f_0-50\,kHz}^{f_0+50\,kHz} S_5(f)df \, \forall f_0 : (f_0-50\,kHz, f_0+50\,kHz) \subset \text{spurious domain}\}$$

$$\beta_{spurious2} = \max\{\int_{f_0-500\,kHz}^{f_0+500\,kHz} S_5(f)df \, \forall f_0 : (f_0-500\,kHz, f_0+500\,kHz) \subset \text{spurious domain}\}$$

where $\beta_{spurious1}$ applies below 1 GHz and $\beta_{spurious2}$ applies above 1 GHz. The following metric is defined for the outer 5 MHz of the region covered by the general E-UTRA SEM $$\beta_{SEM} = \max\{\int_{f_0-500\,kHz}^{f_0+500\,kHz} S_5(f)df \, \forall f_0 : (f_0-500\,kHz, f_0+500\,kHz) \subset \text{outer 5 MHz } SEM\}$$

Figure 8:
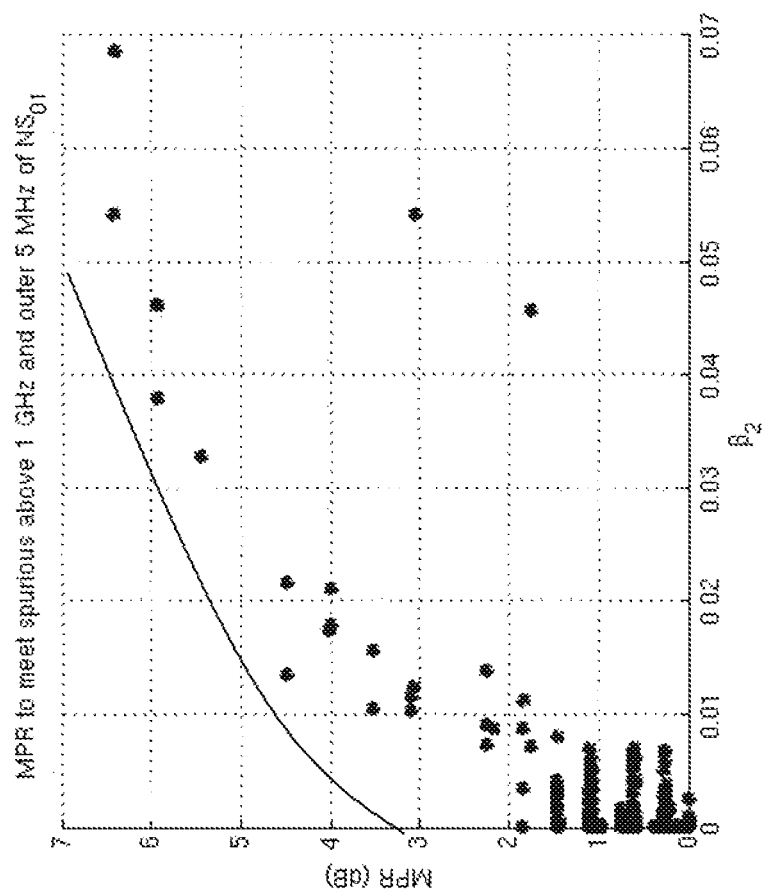

The above metrics can be combined into single metrics covering the spurious domain and the outer 5 MHz of the general E-UTRA spectral emissions mask. Below 1 GHz, $$\beta_1 = \max\{10 \cdot \beta_{spurious1}, \beta_{SEM}/1.26\}$$

where the factor of 1.26 is used to account for the fact that the requirement for the outer 5 MHz of the SEM is 1 dB relaxed relative to the spurious requirement below 1 GHz, when both are referred to a 1 MHz bandwidth. Similarly, above 1 GHz, the combined metric is $$\beta_2 = \max\{\beta_{spurious2}, \beta_{SEM}/3.16\}$$

where the factor of 3.16 is used to account for the fact that the requirement for the outer 5 MHz of the SEM is 5 dB relaxed relative to the spurious requirement above 1 GHz. An example mapping of the MPR needed to meet all ACLR requirements as a function of $\beta_2$ is shown in FIG. 8. A few observations can be made with respect to FIG. 8.

Even for allocations for which $\beta_2$ is 0, as much as 2 dB of MPR may be required to meet the spurious requirement and the outer 5 MHz of the SEM. The need for MPR when $\beta_2$ is 0 may be due to the influence of spectral components due to higher order odd terms of the PA nonlinearity.

The MPR needed for a given allocation can be determined using the above mappings by performing the following steps:
(1) Using the mapping of MPR vs. $\gamma_{ACLR}$ to determine the MPR needed to meet all ACLR constraints.
(2) Using the mapping of MPR vs. $\beta_1$ or $\beta_2$ (depending on whether above or below 1 GHz) to determine the MPR needed to meet spurious and SEM requirements.
(3) Determining the maximum of the MPR needed to meet the ACLR requirement and the spurious requirement.
(4) Using the determined maximum as the MPR According to an embodiment of the invention, either the wireless terminal or the base unit has stored in its memory a data structure that maps each value of γ is to a corresponding MPR. This mapping may be specified in an agreed-upon industry standard, and may be generated from simulation data.

In some embodiments of the invention, the need for large MPR values is driven by the spurious region requirement. For example, if it is observed that the MPR needed to meet all ACLR requirements does not exceeded ~3.6 dB, and that the need for large MPR is driven by the spurious requirement, then for allocations for which $S_5(f)$ does not reach the spurious domain, the required MPR should not exceed 3.6 dB. This characteristic may be exploited by using two allocation to MPR mappings—one to be used when $S_5(f)$ does not reach the spurious region and another to be used when $S_5(f)$ does reach the spurious region. This will now be described in more detail using a specific example.

For any allocation, the span of $S_5(f)$ can be determined as follows. In making this determination, it is assumed that the PSD of each RB is measured over a finite range, such as 180 KHz.

Let $f_{min}$ and $f_{max}$ denote the minimum and maximum frequencies of the allocation. The span of $S_5(f)$ is then given by the interval $$[3f_{min}-2f_{max}, 3f_{max}-2f_{min}].$$

Let Δ be defined as $$\max(\text{abs}(f_c-(3f_{min}-2f_{max})), \text{abs}(f_c-(3f_{max}-2f_{min}))).$$

Figure 11:
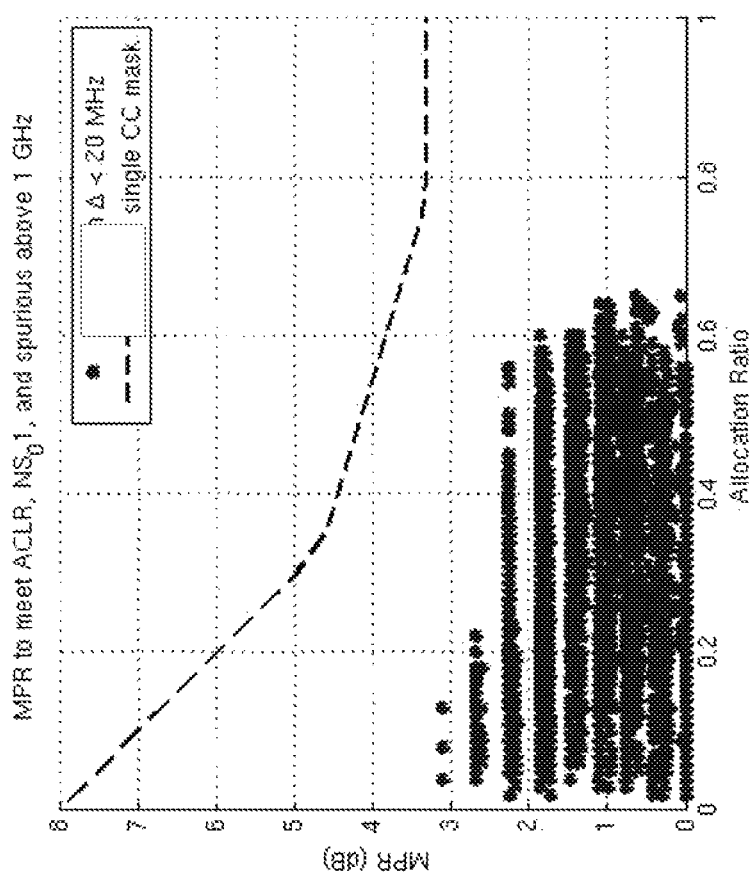
FIGS. 11 and 12 are graphs illustrating mapping functions according to an embodiment of the invention.
Figure 12:
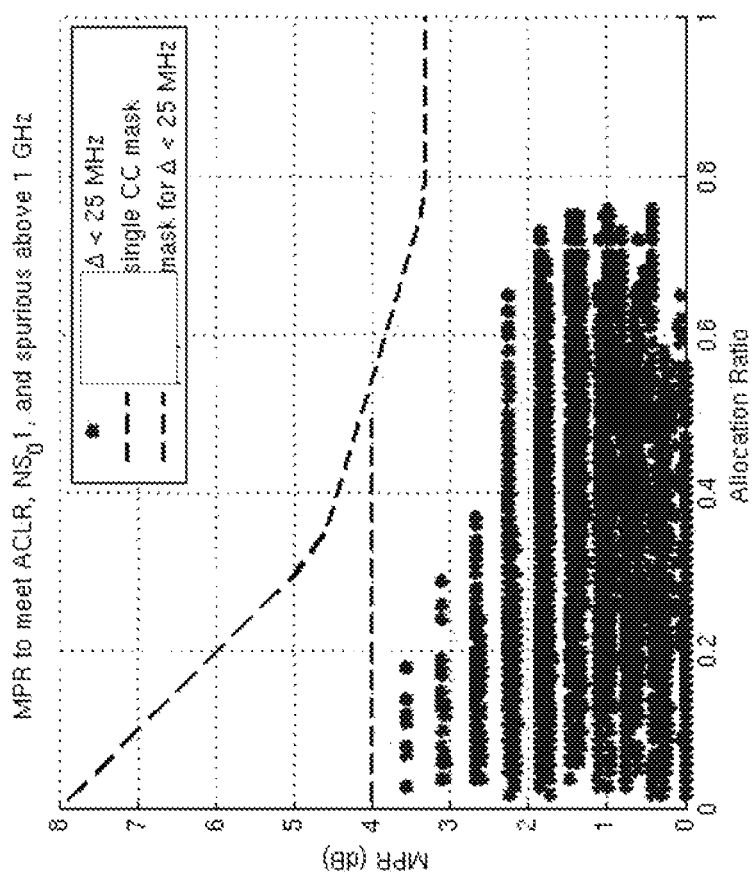

If Δ is less than 25 MHz, then $S_5(f)$ does not reach the spurious domain. If Δ is less than 20 MHz, then $S_5(f)$ does not reach outside the ACLR domain. The MPR as a function of allocation ratio is shown in FIGS. 11 and 12 for Δ less than 20 MHz, and Δ is less than 20 MHz, respectively. FIG. 11 represents a first map, and FIG. 12 represents a second map. In both cases it can be seen that the required MPR is less than 3.6 dB, regardless of the allocation ratio.

In an embodiment of the invention, if the allocation is such that Δ is less than 25 MHz, limit the MPR to 4 dB regardless of the allocation ratio. Thus, for a single component carrier, if Δ is less than 25 MHz, the allowed MPR would be the minimum of the MPR allowed by the MPR mask and 4 dB.

Figure 9:
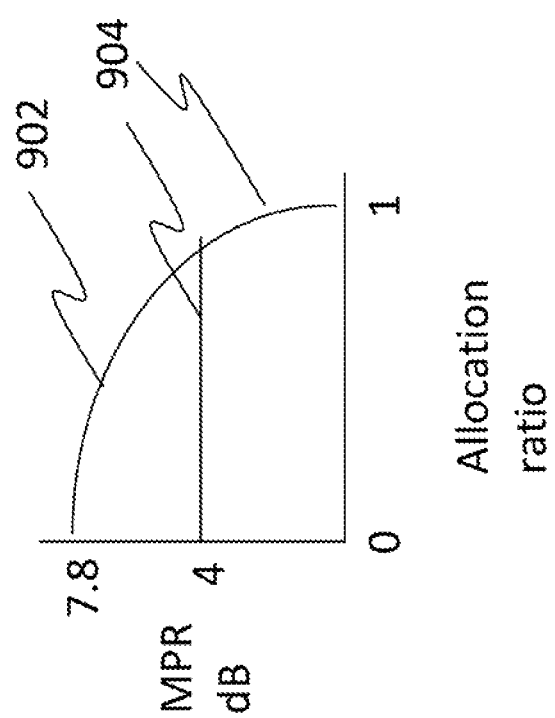
FIG. 9 shows a mapping of MPR values versus allocation ratios in an embodiment of the invention.

Another example of how two maps of MPR vs. the allocation ratio may be used will now be described with reference to FIG. 9. In this example, a first map 902 of the MPR as a function of the allocation ratio is to be used if the spectrum of the fifth order term does not overlap with the spurious region. If the fifth order term does overlap with the spurious region, the second map 904 is used.

In still another embodiment, the base unit or wireless terminal computes $β_1$ or $β_2$ as appropriate (described above), and takes the maximum of: (1) the mapping as a function of the allocation ratio to meet ACLR requirements, and (2) the mapping of $β_1$ or $β_2$ to meet the spurious region requirements.

Figure 10:
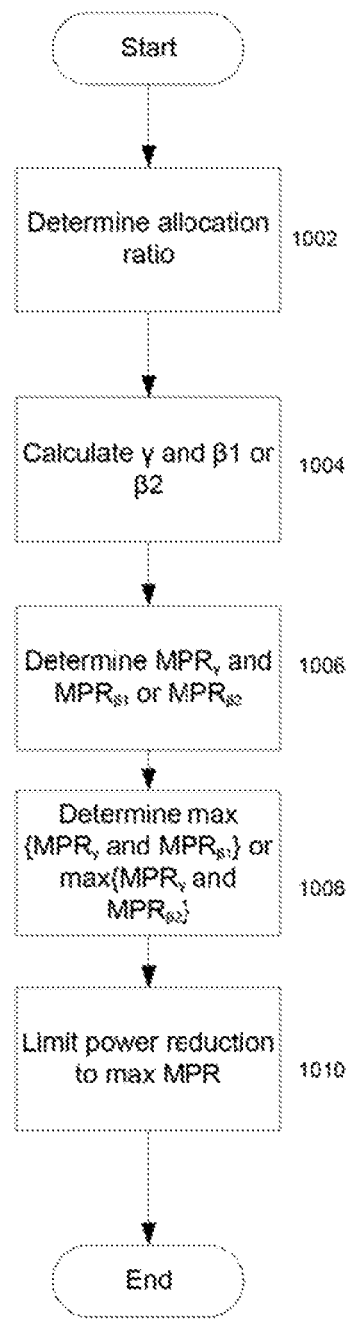
FIG. 10 is a flowchart showing steps performed in an embodiment of the invention.

Referring to FIG. 10, the steps performed by either the base unit or the wireless terminal in an embodiment of the invention will now be described. At step 902, the allocation ratio is determined. At step 904, γ and $β_1$ or $β_2$ are calculated in the manner described previously. At step 906, the MPR based on γ and the MPR based on $β_1$ or $β_2$ is determined using the appropriate mapping. At step 908, the maximum of the MPR based on γ and the MPR based on $β_1$ or $β_2$ is determined. At step 910, the wireless terminal limits its MPR based on the maximum value.

Figure 2:
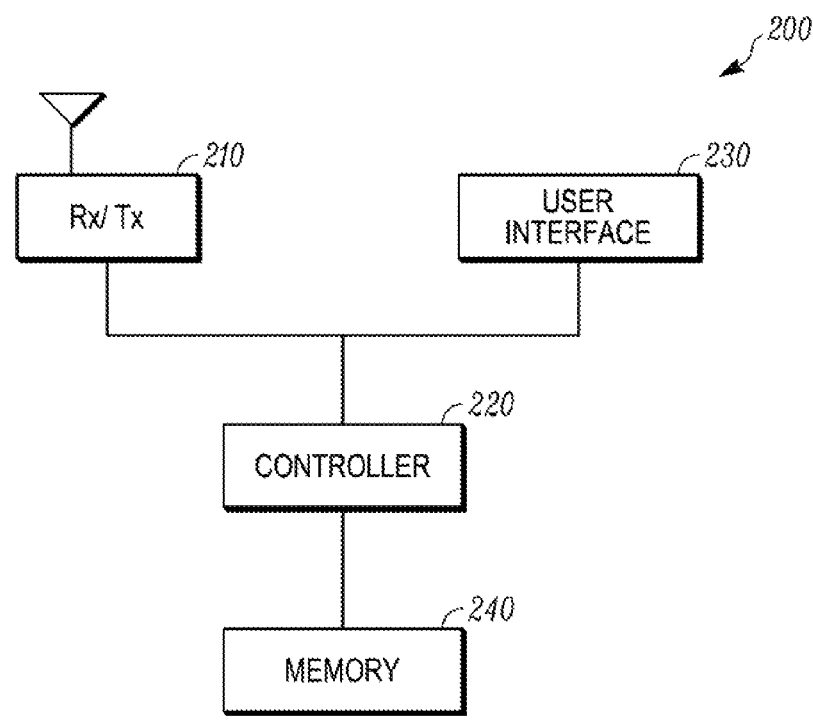
FIG. 2 is a schematic block diagram of a wireless terminal according to an embodiment of the invention.

In an embodiment of the invention, the wireless terminal of FIGS. 1 and 2 transmits an uplink signal at a power that is determined by one or more of the techniques described above. For example, the controller 220 may perform one or more of the steps described above and control the transceiver 210 and/or PA 512 or any of the other components of the wireless device to cause the wireless terminal to transmit the uplink signal at an appropriate power based on the appropriate power reductions. This uplink signal may then be received by a base unit (e.g., 101 or 102) that processes the uplink signal.

In the various embodiments of the invention described herein, wireless terminal the steps of the procedures and calculations that are performed may be ordered in various ways. The components that may perform these procedures and calculations may include one or more of the wireless terminal that will transmit the uplink signal, other wireless terminals, and the base station. Furthermore, the order of the steps of the various processes may be performed in many different orders other than that described. For example, in an embodiment of the invention, the wireless terminal performs the measurements to compute the MPR. Alternatively, the base unit may perform these measurements and signal them to the wireless terminal. The base station knows the UL allocation for each wireless terminal. The UL allocation is conveyed by means of an UL grant embedded in downlink control information (DCI). DCI is transported on Physical Downlink Control Channel (PDCCH) to the wireless terminal. The DCI containing the UL grant includes information pertaining to resource allocation such as the start RB and the length of the allocation (in number of RBs). In addition to the resource allocation information, the base unit can compute the necessary MPR and signal the value to the wireless terminal. The wireless terminal can then use this value to appropriately backoff the transmit power. The MPR can be encoded as a bitmap of N=1, 2, 3, ... bits and can be included in DCI.

While the present disclosure and the best modes thereof have been described in a manner establishing possession and enabling those of ordinary skill to make and use the same, it will be understood and appreciated that there are equivalents to the embodiments disclosed herein and that modifications and variations may be made thereto without departing from the scope and spirit of the appended claims.

What is claimed is:

1. A method of determining a maximum power reduction of a wireless terminal, the method comprising:
   determining, by the wireless terminal, whether a frequency span of an n-th order convolution of a power spectral density function of an uplink signal overlaps with a spurious region, wherein n is one of at least 3 and 5;
   if it is determined that the frequency span of the n-th order convolution of the power spectral density function of the uplink signal overlaps with the spurious region, determining, by the wireless terminal, the maximum power reduction using a first map;
   if it is determined that the frequency span of the n-th order convolution of the power spectral density function of the uplink signal does not overlap with the spurious region, determining, by the wireless terminal, the maximum power reduction using a second map; and
   reducing, by the wireless terminal, transmit power of the wireless terminal based on the determined maximum power reduction.

2. The method of claim 1, further comprising setting an uplink power based on the determined maximum power reduction.

3. The method of claim 1, further comprising computing a maximum configured power based on the determined maximum power reduction.

4. The method of claim 1, further comprising computing a power headroom based on the determined maximum power reduction.

5. The method of claim 1, wherein the maximum power reduction is determined by a base unit and is transmitted to the wireless terminal by the base unit.

6. The method of claim 1, wherein the maximum power reduction is determined by the wireless terminal.

7. The method of claim 1, wherein determining whether the frequency span of the n-th order convolution of the power spectral density function of the uplink signal overlaps with the spurious region comprises:
determining that a metric
$\Delta = \max(\text{abs}(f_c-(3f_{min}-2f_{max})), \text{abs}(f_c-(3f_{max}-2f_{min})))$ is below a frequency threshold, thereby determining that the frequency span power spectral density function of the uplink signal does not overlap with the spurious region, wherein $f_c$ is the carrier frequency, $f_{min}$ is the minimum frequency associated with an allocation to the first map and $f_{max}$ is the maximum frequency associated with the allocation to the first map.

8. The method of claim 1, wherein determining whether the frequency span of the n-th order convolution of the power spectral density function of the uplink signal overlaps with the spurious region comprises:
determining that a metric
$\Delta = \max(\text{abs}(f_c-(3f_{min}-2f_{max})), \text{abs}(f_c-(3f_{max}-2f_{min})))$ is above a frequency threshold, thereby determining that the frequency span power spectral density function of the uplink signal overlaps with the spurious region, wherein $f_c$ is the carrier frequency, $f_{min}$ is the minimum frequency associated with an allocation to the second map and $f_{max}$ is the maximum frequency associated with the allocation to the second map.

* * * * *